United States Patent
Pfaff et al.

(10) Patent No.: US 11,503,339 B2
(45) Date of Patent: Nov. 15, 2022

(54) INTRA PREDICTIONS USING LINEAR OR AFFINE TRANSFORMS WITH NEIGHBOURING SAMPLE REDUCTION

(71) Applicant: Fraunhofer-Gesellschaft zur Foerderung der angewandten Forschung e.V., Munich (DE)

(72) Inventors: Jonathan Pfaff, Berlin (DE); Philipp Helle, Berlin (DE); Michael Schaefer, Berlin (DE); Roman Rischke, Berlin (DE); Tobias Hinz, Berlin (DE); Philipp Merkle, Berlin (DE); Bjoern Stallenberger, Berlin (DE); Martin Winken, Berlin (DE); Mischa Siekmann, Berlin (DE); Heiko Schwarz, Berlin (DE); Detlev Marpe, Berlin (DE); Thomas Wiegand, Berlin (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 0 days.

(21) Appl. No.: 17/351,017

(22) Filed: Jun. 17, 2021

(65) Prior Publication Data
US 2021/0314618 A1    Oct. 7, 2021

Related U.S. Application Data

(63) Continuation of application No. PCT/EP2019/086428, filed on Dec. 19, 2019.

(30) Foreign Application Priority Data

Dec. 20, 2018 (EP) .................................. 18214976

(51) Int. Cl.
*H04N 19/61* (2014.01)
*H04N 19/176* (2014.01)
(Continued)

(52) U.S. Cl.
CPC .......... *H04N 19/61* (2014.11); *H04N 19/176* (2014.11); *H04N 19/184* (2014.11); *H04N 19/44* (2014.11)

(58) Field of Classification Search
CPC .. H04N 19/176; H04N 19/182; H04N 19/184; H04N 19/44; H04N 19/59; H04N 19/593; H04N 19/61
See application file for complete search history.

(56) References Cited

U.S. PATENT DOCUMENTS

2012/0320984 A1    12/2012  Zhou
2014/0064359 A1    3/2014   Rapaka et al.
(Continued)

FOREIGN PATENT DOCUMENTS

CN    107613294 A    1/2018
CN    108886617 A    11/2018
(Continued)

OTHER PUBLICATIONS

Anonymous, "[Uploaded in 2 parts] The H.264 Advanced Video Compression Standard, 2nd Edition, chapter 6,", "H.264 Prediction", Iain E. Richardson, Not Known, Apr. 20, 2010 (Apr. 20, 2010), XP030001637, @2010, 42 pp.
(Continued)

*Primary Examiner* — Jessica M Prince
(74) *Attorney, Agent, or Firm* — Spencer C. Patterson; Grable Martin Fulton PLLC

(57) ABSTRACT

Techniques for encoding/decoding of video signals are described, e.g. implemented in decoders, encoder, methods and non-transitory storage units storing instructions to perform the methods.

(Continued)

A decoder or encoder may be configured to predict a predetermined block of the picture using a plurality of neighbouring samples by reducing the plurality of neighbouring samples to obtain a reduced set of samples values lower, in number of samples, than compared to the plurality of neighbouring samples, subjecting the reduced set of sample values to a linear or affine linear transformation to obtain predicted values for predetermined samples of the predetermined block.

31 Claims, 14 Drawing Sheets

(51) Int. Cl.
    *H04N 19/184*     (2014.01)
    *H04N 19/44*     (2014.01)

(56) References Cited

U.S. PATENT DOCUMENTS

| | | |
|---|---|---|
| 2017/0214940 A1 | 7/2017 | Chien et al. |
| 2019/0116381 A1 | 4/2019 | Lee et al. |
| 2021/0218960 A1* | 7/2021 | Pfaff ................... H04N 19/593 |

FOREIGN PATENT DOCUMENTS

| | | |
|---|---|---|
| EP | 3310058 A1 | 4/2018 |
| WO | 2017196957 A1 | 11/2017 |

OTHER PUBLICATIONS

Bossen, F, et al., "JVET common test conditions and software reference configurations for SDR video", JVET-K1010, Ljubljana, SI, Jul. 2018, 6 pp.

Bross, B , et al., "[Uploaded in 2 parts] Versatile Video Coding (Draft 5)", Document No. JVET-N1001-v10, the Joint Video Experts Team (JVET) of ITU-T SG 16 WP 3 and ISO/IEC JTC 1/SC 29/WG 11, the 14th Meeting: Geneva, CH, Mar. 19-27, 2019, 408 pp, pp. 1-391.

Bross, B , et al., "[Uploaded in 22 parts] Versatile Video Coding (Draft 8)", JVET Meeting: Jan. 7, 2020-Jan. 17, 2020; Brussels; (The Joint Video Exploration Team of ISO/IEC JTC1/SC29/WG11 and ITU-T SG.16), No. JVET-O2001, Mar. 12, 2020 (Mar. 12, 2020), XP030285390, 510 pp.Retrieved from the Internet: URL:http://phenix.int-evry.fr/jvet/doc_end_user/documents/17 Brussels/wg11/JVET-Q2001-v15.zip JVET-O2001-vE.docx [retrieved on Mar. 12, 2020], pp. 1-19.

Dinh, Toan Nguyen, et al., "Reducing Spatial Resolution for MPEG-4 /H.264 Transcoding with Efficient Motion Reusing", Proceedings/ 7th IEEE International Conference on Computer and Information Technology: Oct. 16-19, 2007, Aizu-Wakamatsu City, Fukushima, Japan, IEEE, Piscataway, NJ, USA, Oct. 16, 2007 (Oct. 16, 2007), pp. 577-580, XP031338096, ISBN: 978-0-7695-2983-7, @2007, 4 pp.

Helle, P, et al., "CE3: Non-linear weighted intra prediction (tests 2.2.1 and 2.2.2)", 12. JVET Meeting; Oct. 3, 2018-Oct. 12, 2018; Macao; (The Joint Video Exploration Team of ISO/IEC JTC1/SC29/WG11 and ITU-T SG. 16), No. JVET-L0199 Sep. 28, 2018 (Sep. 28, 2018), XP030193995,Retrieved from the Internet: URL:http://phenix.int-evry.fr/jvet/doc_end_user/documents/12_Macao/wg11/JVET-L0199-v2.zip JVET-L0199-v2.docx [retrieved on Sep. 28, 2018] cited in the application,10 pp.

Helle, P, et al., "CE3-related: Non-linear weighted intra prediction (cross-check report in JVET-K0262)", Joint Video Experts Team (JVET) of ITU-T SG 16 WP 3 and ISO/IEC JTC 1/SC 29/WG 11, 11th Meeting: Ljubljana, SI, Jul. 10-18, 2018, http://phenix.itsudparis.eu/jvet/doc_end_user/current_document.php?id=3705, 8 pp.

Helle, P, et al., "Intra Picture Prediction for Video Coding with Neural Networks", 2019 Data Compression Conference (DCC), IEEE, Mar. 26, 2019 (Mar. 26, 2019), pp. 448-457, XP033548483, DOI: 10.1109/DCC.2019.00053, 10 pp.

Pfaff, J, et al., "CE3: Affine linear weighted intra prediction (test 1.2.1, test 1.2.2)", JVET Meeting; Jan. 9, 2019-Jan. 18, 2019; Marrakech; (The Joint Video Exploration Team of ISO/IEC JTC1/SC29/WG11 and ITU-T SG.16), 12 pp. No. JVET-M0043 Jan. 2, 2019 (Jan. 2, 2019), XP030200159, Retrieved from the Internet: URL:http://phenix.int-evry.fr/jvet/docenduser/documents/13 Marrakech/wgll/JVET~M0043-vl.zip JVET-M0043 vl.docx.

Pfaff, J, et al., "Intra Prediction Modes based on Neural Networks", Joint Video Experts Team (JVET) of ITU-T SG 16 WP 3 and ISO/IEC JTC 1/SC 29/WG 11, 10th Meeting: San Diego, US, Apr. 10-20, 2018 http://phenix.itsudparis.eu/jvet/doc_end_user/current_document.php?id=3438.

Pfaff, Jonathan , et al., "CE3: Affine linear weighted intra prediction (CE3-4.1, CE3-4.2)", Joint Video Experts Team (JVET) of ITU-T SG 16 WP 3 and ISO/IEC JTC 1/SC 29/WG 11 14th Meeting: Geneva, CH, Mar. 19, 2019, 17 pp.http://phenix.itsudparis.eu/jvet/doc_end_user/current_document.php?id=5937, sections 1-2.

Van Der Auwera (Qualcomm), et al., "Description of Core Experiment 3 (CE3): Intra Prediction and Mode Coding", JVET Meeting; Oct. 3, 2018-Oct. 12, 2018; Macao; (The Joint Mdeo Exploration Team of ISO/IEC JTC1/SC29/WG11 and ITU-T SG. 16), No. JVET-L 1023 Nov. 4, 2018 (Nov. 4, 2018), XP030198606, 22 pp.Retrieved from the Internet: URL:http://phenix.int-evry.fr/jvet/doc_end_user/documents/12_Macao/wg11/JVET-L1023-v2.zip JVET-L 1023_v2.docx [retrieved on Nov. 4, 2018].

Wang, Yao, "[Uploaded in 3 parts] EL5123—Image Processing. Image Sampling and Resizing", Lecture Notes—EL5123 Image Processing, Sep. 1, 2011 (Sep. 1, 2011), XP055673981,54 pp.Retrieved from the Internet: URL:http://eeweb.poly.edu/~yao/EL5123/lecture8_sampling.pdf [retrieved on Mar. 5, 2020], pp. 1-21.

Bross, Benjamin, et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N1001-v7, 386 pp.

Bross, Benjamin, et al., "[Uploaded in 16 parts] Versatile Video Coding (Draft 5)", 14th JVET Meeting; Mar. 19, 2019-Mar. 27, 2019; The Joint Video Exploration Team of ISO/IEC JTC1/SC29/WG11 and ITU-T SG. 16), JVET-N1001-V8, XP030205561,26 pp.

* cited by examiner

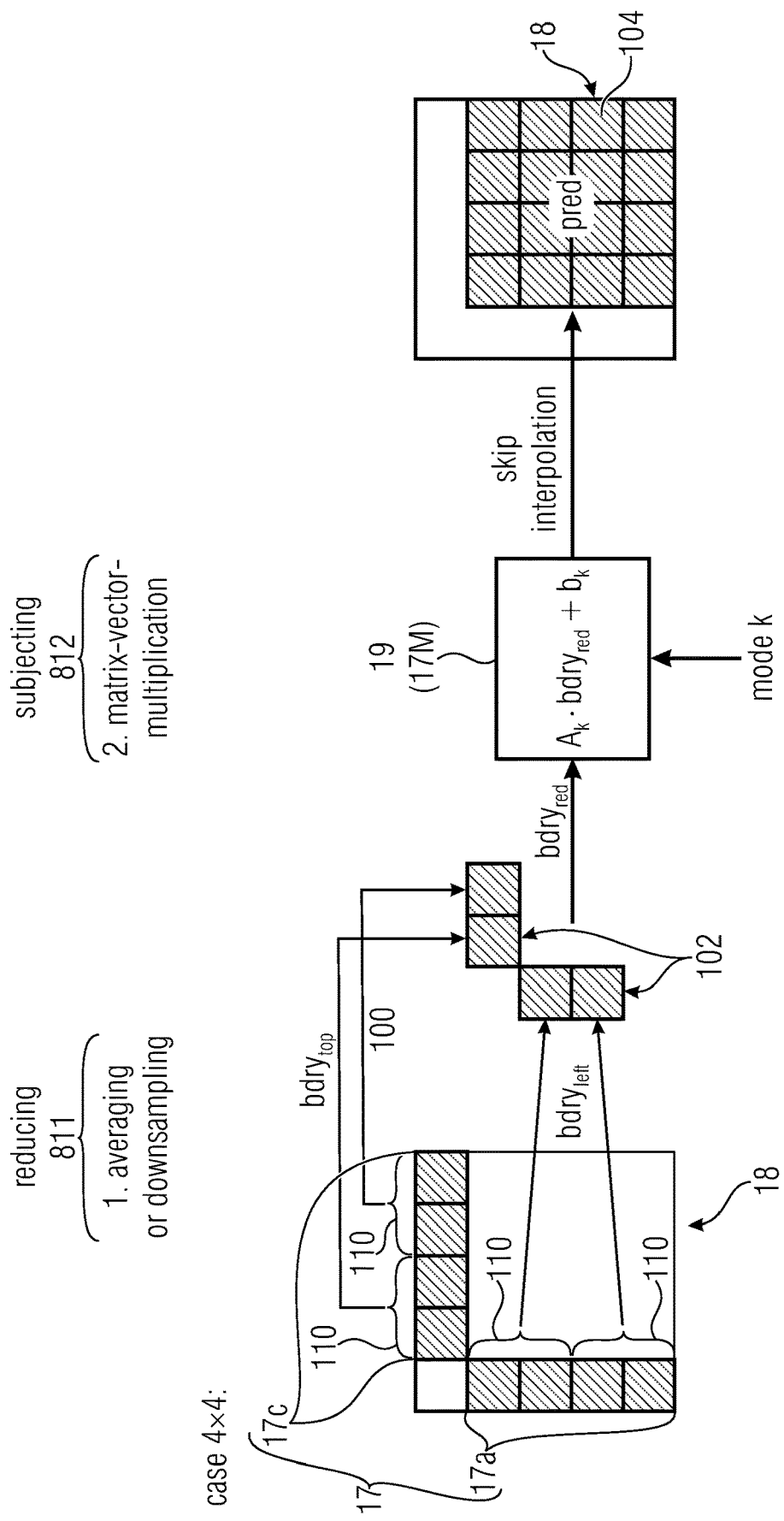
Fig. 7.1
4×4 blocks

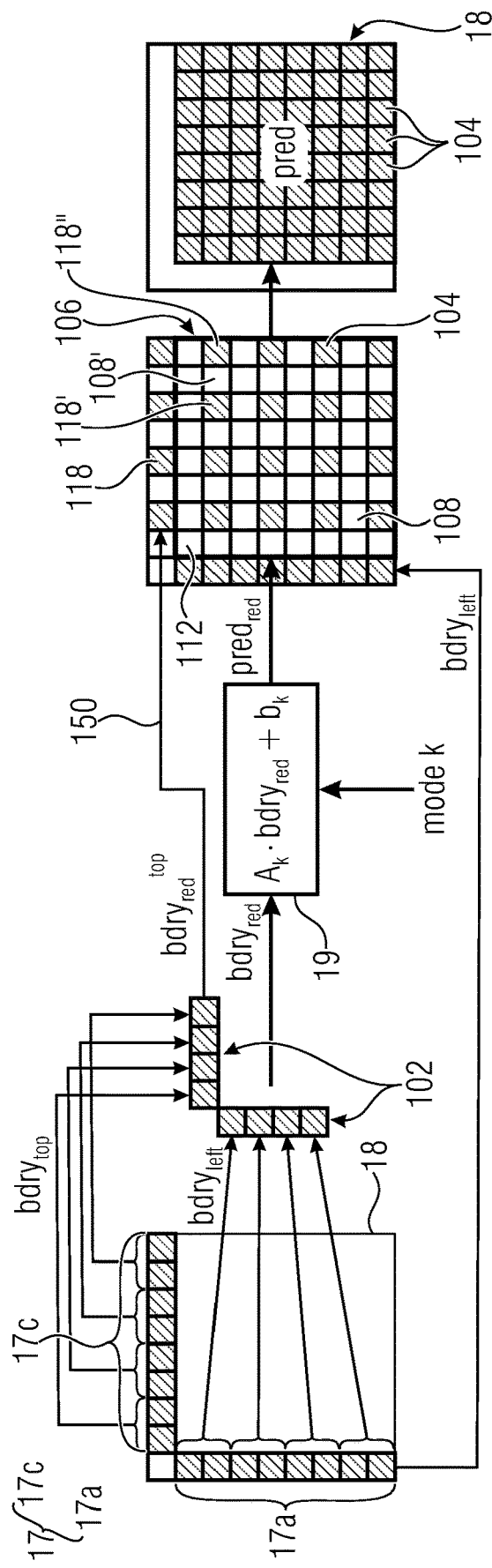
Fig. 7.2
8×8 blocks

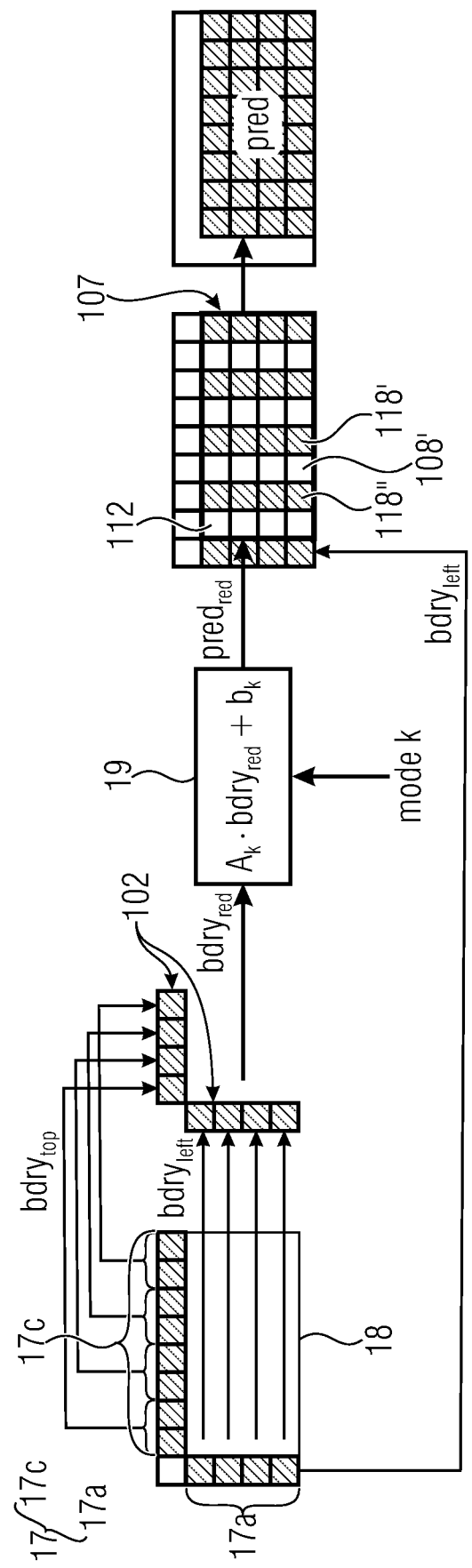
Fig. 7.3
8×4 blocks

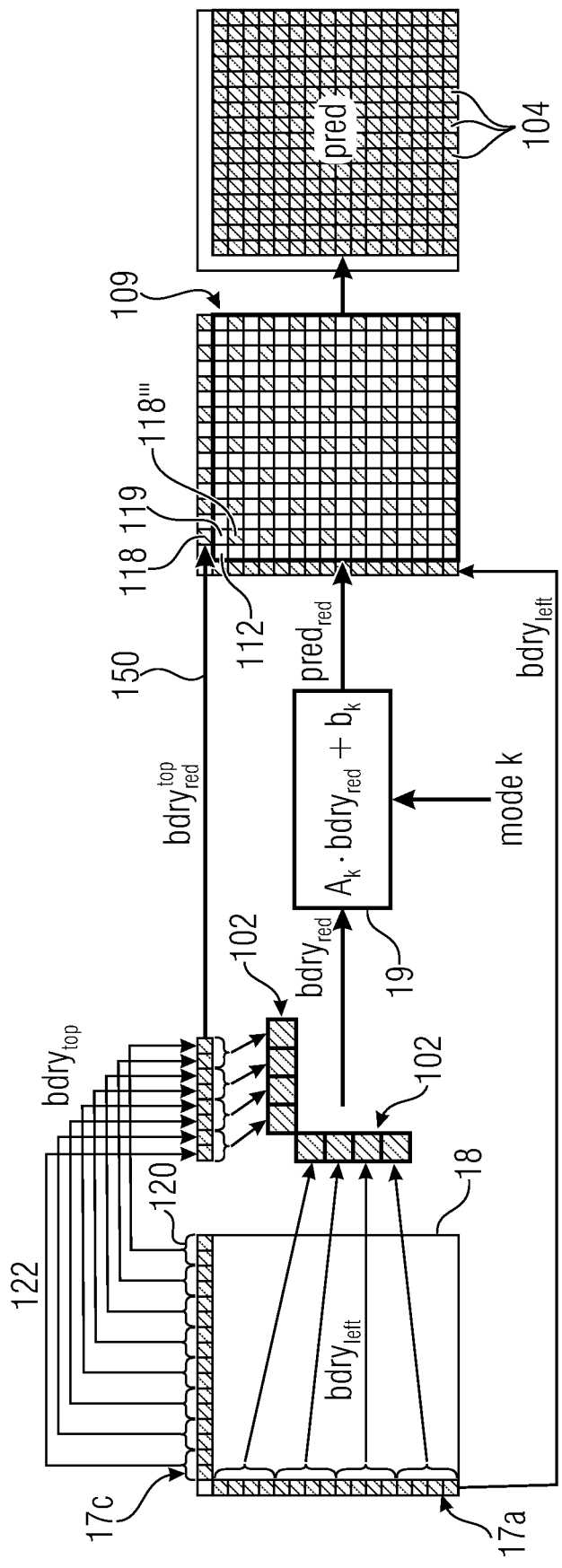
Fig. 7.4
16×16 blocks

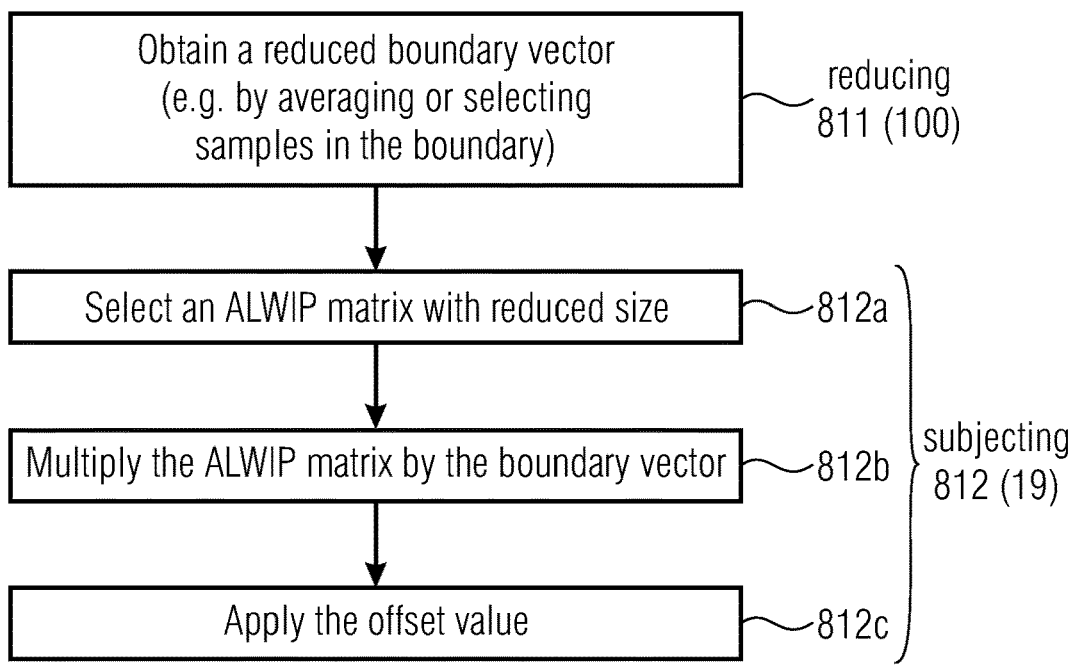
Fig. 8.1
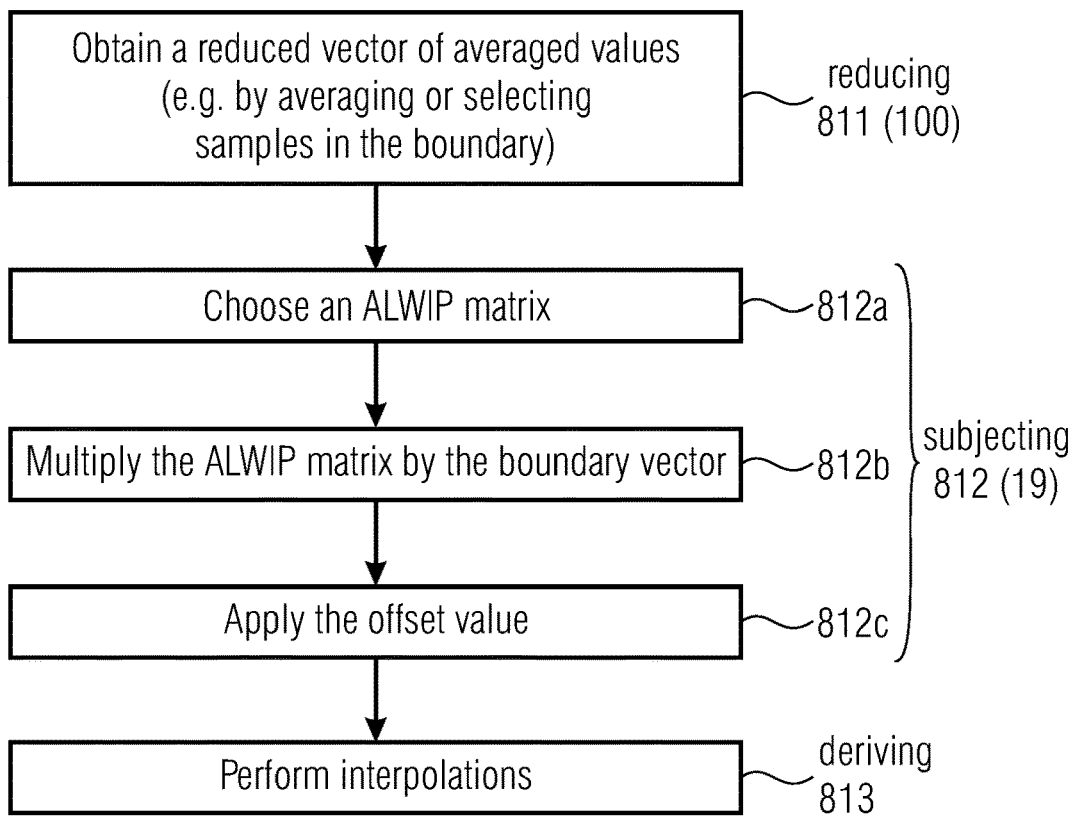
Fig. 8.2

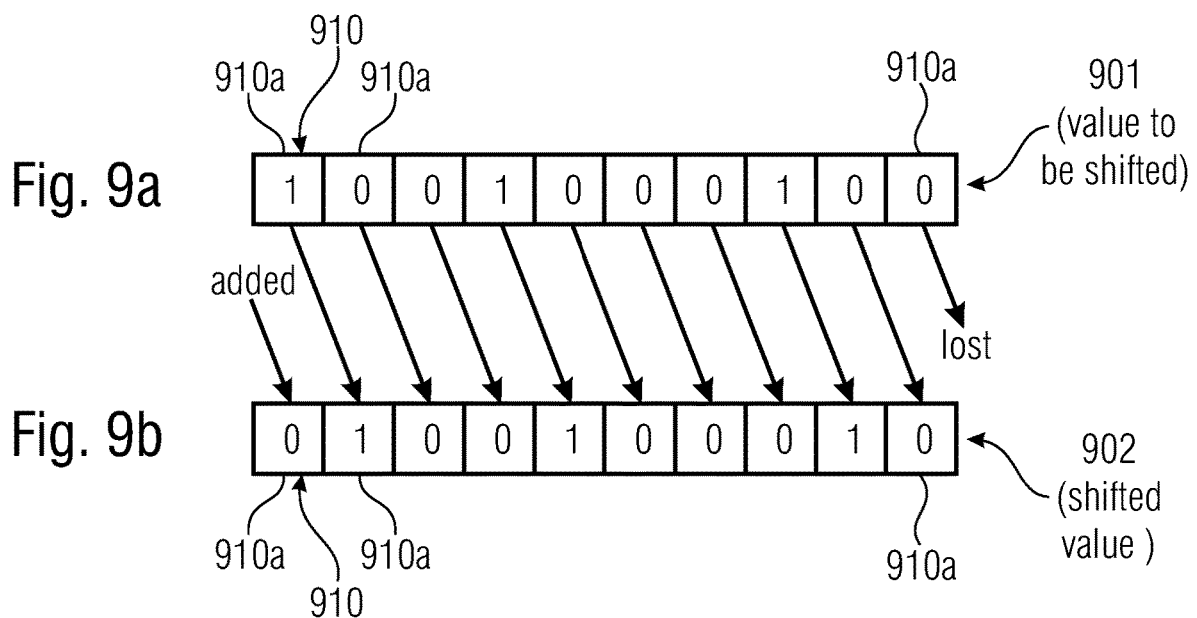

INTRA PREDICTIONS USING LINEAR OR AFFINE TRANSFORMS WITH NEIGHBOURING SAMPLE REDUCTION

CROSS-REFERENCE TO RELATED APPLICATIONS

This application is a continuation of copending International Application No. PCT/EP2019/086428, filed Dec. 19, 2019, which is incorporated herein by reference in its entirety, and additionally claims priority from European Application No. 18214976.5, filed Dec. 20, 2018, which is also incorporated herein by reference.

BACKGROUND OF THE INVENTION

In the following, different inventive examples, embodiments and aspects will be described. At least some of these examples, embodiments and aspects refer, inter alia, to methods and/or apparatus for video coding and/or for performing intra Predictions e.g. using linear or affine transforms with neighbouring sample reduction and/or for optimizing video delivery (e.g., broadcast, streaming, file playback, etc) e.g. for video applications and/or for virtual reality applications. Further, examples, embodiments and aspects may refer to High Efficiency Video Coding (HEVC) or successors. Also, further embodiments, examples and aspects will be defined by the enclosed claims.

It should be noted that any embodiments, examples and aspects as defined by the claims can be supplemented by any of the details (features and functionalities) described in the following chapters.

Also, the embodiments, examples and aspects described in the following chapters can be used individually, and can also be supplemented by any of the features in another chapter, or by any feature included in the claims.

Also, it should be noted that individual examples, embodiments and aspects described herein can be used individually or in combination. Thus, details can be added to each of said examples, embodiments and individual aspects without adding details to another one of said aspects.

It should also be noted that the present disclosure describes, explicitly or implicitly, features of decoding and/or encoding system and/or method.

Moreover, features and functionalities disclosed herein relating to a method can also be used in an apparatus. Furthermore, any features and functionalities disclosed herein with respect to an apparatus can also be used in a corresponding method. In other words, the methods disclosed herein can be supplemented by any of the features and functionalities described with respect to the apparatuses. Also, any of the features and functionalities described herein can be implemented in hardware or in software, or using a combination of hardware and software, as will be described in other sections, such as "further embodiments and examples", etc.

Moreover, any of the features described in parentheses ("( . . . )" or "[ . . . ]") may be considered as optional in some examples, embodiments, or aspects.

SUMMARY

An embodiment may have a decoder for decoding a picture from a data stream, wherein the decoder is configured to subdivide the picture into a plurality of blocks of different block sizes which has a predetermined block, wherein the decoder is configured to predict the predetermined block of the picture using a plurality of neighbouring samples by reducing the plurality of neighbouring samples to obtain a reduced set of samples values lower, in number of samples, than compared to the plurality of neighbouring samples, subjecting the reduced set of sample values to a linear or affine linear transformation to obtain predicted values for predetermined samples of the predetermined block, wherein the decoder is configured to perform the reduction by grouping the plurality of neighbouring samples into groups of one or more consecutive neighbouring samples and performing a downsampling or an averaging on each of the group of one or more neighbouring samples which has two or more than two neighbouring samples, wherein the decoder is configured to select the linear or affine linear transformation depending on a width W and height H of the predetermined block such that the linear or affine linear transformation selected for the predetermined block is selected out of a first set of linear or affine linear transformations as long as the width W and height H of the predetermined block are within a first set of width/height pairs and a second set of linear or affine linear transformations as long as the width W and height H of the predetermined block are within a second set of width/height pairs which is disjoint to the first set of width/height pairs.

According to another embodiment, a decoding method for decoding a picture subdivided into a plurality of blocks of different block sizes, which has a predetermined block, may have the steps of: predicting a predetermined block of the picture using a plurality of neighbouring samples by reducing, by downsampling or averaging, the plurality of neighbouring samples to obtain a reduced set of samples values lower, in number of samples, than compared to the plurality of neighbouring samples, wherein reducing has grouping the plurality of neighbouring samples into groups of one or more consecutive neighbouring samples and performing a downsampling or an averaging on each of the group of one or more neighbouring samples which has two or more than two neighbouring samples, and subjecting the reduced set of sample values to a linear or affine linear transformation to obtain predicted values for predetermined samples of the predetermined block, wherein subjecting includes selecting the linear or affine linear transformation depending on a width W and height H of the predetermined block such that the linear or affine linear transformation selected for the predetermined block is selected out of a first set of linear or affine linear transformations as long as the width W and height H of the predetermined block are within a first set of width/height pairs and a second set of linear or affine linear transformations as long as the width W and height H of the predetermined block are within a second set of width/height pairs which is disjoint to the first set of width/height pairs.

Another embodiment may have an encoder for encoding a picture into a data stream, the encoder being configured to subdivide the picture into a plurality of blocks of different block sizes, which has a predetermined block, the encoder being configured to predict a predetermined block of the picture using a plurality of neighbouring samples by reducing the plurality of neighbouring samples to obtain a reduced set of samples values lower, in number of samples, than compared to the plurality of neighbouring samples, subjecting the reduced set of sample values to a linear or affine linear transformation to obtain predicted values for predetermined samples of the predetermined block, wherein the encoder is configured to perform the reduction by grouping the plurality of neighbouring samples into groups of one or more consecutive neighbouring samples and performing a downsampling or an averaging on each of the group of one or more neighbouring samples which has more than two neighbouring samples, wherein the encoder is configured to select the linear or affine linear transformation depending on a width W and height H of the predetermined block such that the linear or affine linear transformation selected for the predetermined block is selected out of a first set of linear or affine linear transformations as long as the width W and height H of the predetermined block are within a first set of width/height pairs and a second set of linear or affine linear transformations as long as the width W and height H of the predetermined block are within a second set of width/height pairs which is disjoint to the first set of width/height pairs.

According to another embodiment, an encoding method for encoding a picture subdivided into a plurality of blocks of different block sizes, which has a predetermined block, may have the steps of: predicting a predetermined block of the picture using a plurality of neighbouring samples by reducing, by downsampling or averaging, the plurality of neighbouring samples to obtain a reduced set of samples values lower, in number of samples, than compared to the plurality of neighbouring samples, wherein reducing has grouping the plurality of neighbouring samples into groups of one or more consecutive neighbouring samples and performing a downsampling or an averaging on each of the group of one or more neighbouring samples which has two or more than two neighbouring samples; and subjecting the reduced set of sample values to a linear or affine linear transformation to obtain predicted values for predetermined samples of the predetermined block, wherein subjecting includes selecting the linear or affine linear transformation depending on a width W and height H of the predetermined block such that the linear or affine linear transformation selected for the predetermined block is selected out of a first set of linear or affine linear transformations as long as the width W and height H of the predetermined block are within a first set of width/height pairs and a second set of linear or affine linear transformations as long as the width W and height H of the predetermined block are within a second set of width/height pairs which is disjoint to the first set of width/height pairs.

Another embodiment may have a non-transitory digital storage medium having stored thereon a computer program for performing a decoding method for decoding a picture subdivided into a plurality of blocks of different block sizes, which has a predetermined block, the method having the steps of: predicting a predetermined block of the picture using a plurality of neighbouring samples by reducing, by downsampling or averaging, the plurality of neighbouring samples to obtain a reduced set of samples values lower, in number of samples, than compared to the plurality of neighbouring samples, wherein reducing has grouping the plurality of neighbouring samples into groups of one or more consecutive neighbouring samples and performing a downsampling or an averaging on each of the group of one or more neighbouring samples which has two or more than two neighbouring samples, and subjecting the reduced set of sample values to a linear or affine linear transformation to obtain predicted values for predetermined samples of the predetermined block, wherein subjecting includes selecting the linear or affine linear transformation depending on a width W and height H of the predetermined block such that the linear or affine linear transformation selected for the predetermined block is selected out of a first set of linear or affine linear transformations as long as the width W and height H of the predetermined block are within a first set of width/height pairs and a second set of linear or affine linear transformations as long as the width W and height H of the predetermined block are within a second set of width/height pairs which is disjoint to the first set of width/height pairs, when said computer program is run by a computer.

According to an aspect, there is provided a decoder for decoding a picture from a data stream, configured to predict a predetermined block of the picture using a plurality of neighbouring samples by
  reducing (e.g. by averaging or downsampling) the plurality of neighbouring samples to obtain a reduced set of samples values lower, in number of samples, than compared to the plurality of neighbouring samples,
  subjecting the reduced set of sample values to a linear or affine linear transformation to obtain predicted values for predetermined samples of the predetermined block.

In examples, the decoder may be further configured to perform the reducing, e.g. by averaging downsampling, the plurality of neighbouring samples to obtain the reduced set of samples values lower, in number of samples, than compared to the plurality of neighbouring samples.

In some cases, the decoder may also derive, e.g. by interpolation, prediction values for further samples of the predetermined block on the basis of the predicted values for the predetermined samples and the plurality of neighboring samples. Accordingly, an upsampling operation may be applied.

According to an aspect, there is provided an encoder for encoding a picture from a data stream, configured to predict a predetermined block of the picture using a plurality of neighbouring samples by
  reducing (e.g. by averaging or downsampling) the plurality of neighbouring samples to obtain a reduced set of samples values lower, in number of samples, than compared to the plurality of neighbouring samples,
  subjecting the reduced set of sample values to a linear or affine linear transformation to obtain predicted values for predetermined samples of the predetermined block.

In examples, the encoder may be further configured to perform the reducing by downsampling the plurality of neighbouring samples to obtain the reduced set of samples values lower, in number of samples, than compared to the plurality of neighbouring samples.

In some cases, the encoder may also derive, e.g. by interpolation, prediction values for further samples of the predetermined block on the basis of the predicted values for the predetermined samples and the plurality of neighboring samples. Accordingly, an upsampling operation may be applied.

In examples, there may be provided a system comprising an encoder according as above and/or a decoder as above. In some examples, the hardware and/or at least some procedural routines of the encoder may be the same of those of the decoder.

In examples, there may be provided a decoding method comprising
  predicting a predetermined block of the picture using a plurality of neighbouring samples by
    reducing, e.g. by downsampling or averaging, the plurality of neighbouring samples to obtain a reduced set of samples values lower, in number of samples, than compared to the plurality of neighbouring samples,
    subjecting the reduced set of sample values to a linear or affine linear transformation to obtain predicted values for predetermined samples of the predetermined block.

In examples, there may be provided an encoding method comprising
  predicting a predetermined block of the picture using a plurality of neighbouring samples by
    reducing, e.g. by downsampling or averaging, the plurality of neighbouring samples to obtain a reduced set of samples values lower, in number of samples, than compared to the plurality of neighbouring samples,
    subjecting the reduced set of sample values to a linear or affine linear transformation to obtain predicted values for predetermined samples of the predetermined block.

In examples, there may be provided a non-transitory storage unit storing instructions which, when executed by a processor, cause the processor to perform a method as above.

BRIEF DESCRIPTION OF THE DRAWINGS

Embodiment of the present invention will be detailed subsequently referring to the appended drawings, in which:
FIGS. 7.1-7.4 show examples of operations according to examples;
FIGS. 8.1 and 8.2 show examples of methods according to examples;
FIGS. 9a-b show an example.

DETAILED DESCRIPTION OF THE INVENTION

1 Encoders, Decoders

In the following, various examples are described which may assist in achieving a more effective compression when using intra-prediction. Some examples achieve the compression efficiency increase by spending a set of intra-prediction modes. The latter ones may be added to other intra-prediction modes heuristically designed, for instance, or may be provided exclusively. And even other examples make use of both of the just-discussed specialties.

Figure 1:
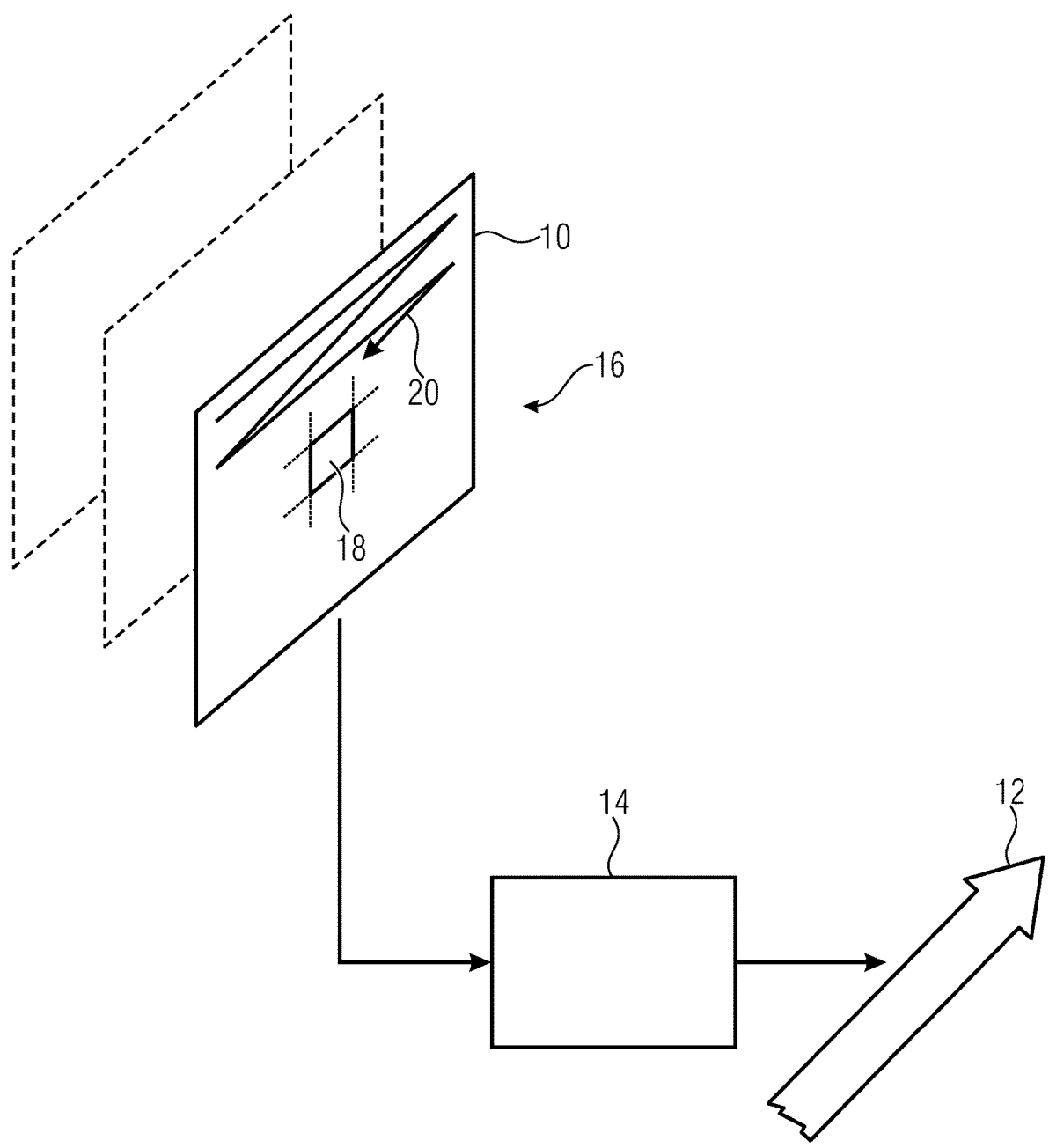
FIGS. 1 and 2 show encoder examples.

In order to ease the understanding of the following examples of the present application, the description starts with a presentation of possible encoders and decoders fitting thereto into which the subsequently outlined examples of the present application could be built. FIG. 1 shows an apparatus for block-wise encoding a picture 10 into a datastream 12. The apparatus is indicated using reference sign 14 and may be a still picture encoder or a video encoder. In other words, picture 10 may be a current picture out of a video 16 when the encoder 14 is configured to encode video 16 including picture 10 into datastream 12, or encoder 14 may encode picture 10 into datastream 12 exclusively.

As mentioned, encoder 14 performs the encoding in a block-wise manner or block-base. To this, encoder 14 subdivides picture 10 into blocks, units of which encoder 14 encodes picture 10 into datastream 12. Examples of possible subdivisions of picture 10 into blocks 18 are set out in more detail below. Generally, the subdivision may end-up into blocks 18 of constant size such as an array of blocks arranged in rows and columns or into blocks 18 of different block sizes such as by use of a hierarchical multi-tree subdivisioning with starting the multi-tree subdivisioning from the whole picture area of picture 10 or from a pre-partitioning of picture 10 into an array of tree blocks wherein these examples shall not be treated as excluding other possible ways of subdivisioning picture 10 into blocks 18.

Further, encoder 14 is a predictive encoder configured to predictively encode picture 10 into datastream 12. For a certain block 18 this means that encoder 14 determines a prediction signal for block 18 and encodes the prediction residual, i.e. the prediction error at which the prediction signal deviates from the actual picture content within block 18, into datastream 12.

Encoder 14 may support different prediction modes so as to derive the prediction signal for a certain block 18. The prediction modes, which are of importance in the following examples, are intra-prediction modes according to which the inner of block 18 is predicted spatially from neighboring, already encoded samples of picture 10. The encoding of picture 10 into datastream 12 and, accordingly, the corresponding decoding procedure, may be based on a certain coding order 20 defined among blocks 18. For instance, the coding order 20 may traverse blocks 18 in a raster scan order such as row-wise from top to bottom with traversing each row from left to right, for instance. In case of hierarchical multi-tree based subdivisioning, raster scan ordering may be applied within each hierarchy level, wherein a depth-first traversal order may be applied, i.e. leaf nodes within a block of a certain hierarchy level may precede blocks of the same hierarchy level having the same parent block according to coding order 20. Depending on the coding order 20, neighboring, already encoded samples of a block 18 may be located usually at one or more sides of block 18. In case of the examples presented herein, for instance, neighboring, already encoded samples of a block 18 are located to the top of, and to the left of block 18.

Intra-prediction modes may not be the only ones supported by encoder 14. In case of encoder 14 being a video encoder, for instance, encoder 14 may also support inter-prediction modes according to which a block 18 is temporarily predicted from a previously encoded picture of video 16. Such an inter-prediction mode may be a motion-compensated prediction mode according to which a motion vector is signaled for such a block 18 indicating a relative spatial offset of the portion from which the prediction signal of block 18 is to be derived as a copy. Additionally or alternatively, other non-intra-prediction modes may be available as well such as inter-prediction modes in case of encoder 14 being a multi-view encoder, or non-predictive modes according to which the inner of block 18 is coded as is, i.e. without any prediction.

Figure 2:
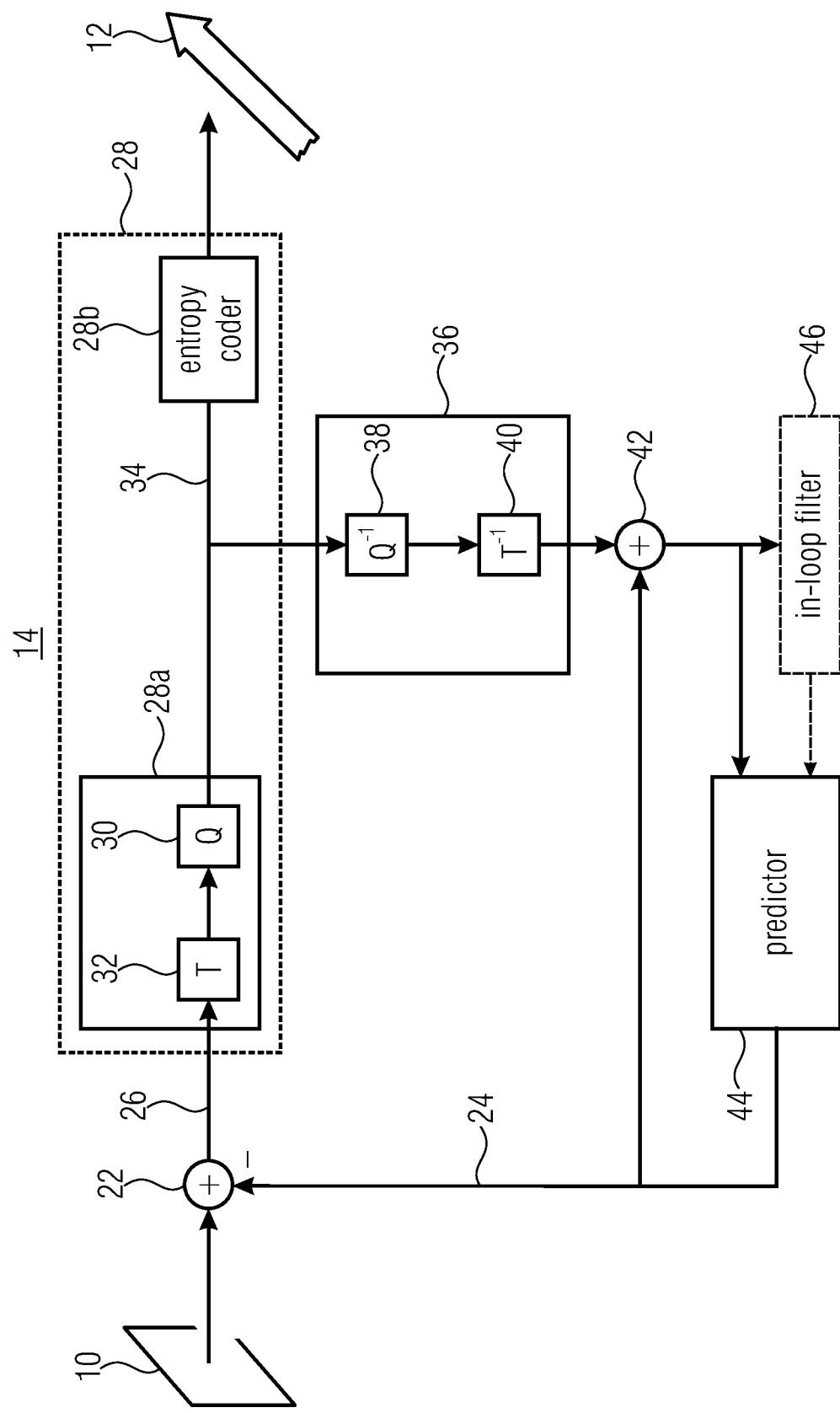

Before starting with focusing the description of the present application onto intra-prediction modes, a more specific example for a possible block-based encoder, i.e. for a possible implementation of encoder 14, as described with respect to FIG. 2 with then presenting two corresponding examples for a decoder fitting to FIGS. 1 and 2, respectively.

FIG. 2 shows a possible implementation of encoder 14 of FIG. 1, namely one where the encoder is configured to use transform coding for encoding the prediction residual although this is nearly an example and the present application is not restricted to that sort of prediction residual coding. According to FIG. 2, encoder 14 comprises a subtractor 22 configured to subtract from the inbound signal, i.e. picture 10 or, on a block basis, current block 18, the corresponding prediction signal 24 so as to obtain the prediction residual signal 26 which is then encoded by a prediction residual encoder 28 into a datastream 12. The prediction residual encoder 28 is composed of a lossy encoding stage 28a and a lossless encoding stage 28b. The lossy stage 28a receives the prediction residual signal 26 and comprises a quantizer 30 which quantizes the samples of the prediction residual signal 26. As already mentioned above, the present example uses transform coding of the prediction residual signal 26 and accordingly, the lossy encoding stage 28a comprises a transform stage 32 connected between subtractor 22 and quantizer 30 so as to transform such a spectrally decomposed prediction residual 26 with a quantization of quantizer 30 taking place on the transformed coefficients where presenting the residual signal 26. The transform may be a DCT, DST, FFT, Hadamard transform or the like. The transformed and quantized prediction residual signal 34 is then subject to lossless coding by the lossless encoding stage 28b which is an entropy coder entropy coding quantized prediction residual signal 34 into datastream 12. Encoder 14 further comprises the prediction residual signal reconstruction stage 36 connected to the output of quantizer 30 so as to reconstruct from the transformed and quantized prediction residual signal 34 the prediction residual signal in a manner also available at the decoder, i.e. taking the coding loss is quantizer 30 into account. To this end, the prediction residual reconstruction stage 36 comprises a dequantizer 38 which perform the inverse of the quantization of quantizer 30, followed by an inverse transformer 40 which performs the inverse transformation relative to the transformation performed by transformer 32 such as the inverse of the spectral decomposition such as the inverse to any of the above-mentioned specific transformation examples. Encoder 14 comprises an adder 42 which adds the reconstructed prediction residual signal as output by inverse transformer 40 and the prediction signal 24 so as to output a reconstructed signal, i.e. reconstructed samples. This output is fed into a predictor 44 of encoder 14 which then determines the prediction signal 24 based thereon. It is predictor 44 which supports all the prediction modes already discussed above with respect to FIG. 1. FIG. 2 also illustrates that in case of encoder 14 being a video encoder, encoder 14 may also comprise an in-loop filter 46 with filters completely reconstructed pictures which, after having been filtered, form reference pictures for predictor 44 with respect to inter-predicted block.

As already mentioned above, encoder 14 operates block-based. For the subsequent description, the block bases of interest is the one subdividing picture 10 into blocks for which the intra-prediction mode is selected out of a set or plurality of intra-prediction modes supported by predictor 44 or encoder 14, respectively, and the selected intra-prediction mode performed individually. Other sorts of blocks into which picture 10 is subdivided may, however, exist as well. For instance, the above-mentioned decision whether picture 10 is inter-coded or intra-coded may be done at a granularity or in units of blocks deviating from blocks 18. For instance, the inter/intra mode decision may be performed at a level of coding blocks into which picture 10 is subdivided, and each coding block is subdivided into prediction blocks. Prediction blocks with encoding blocks for which it has been decided that intra-prediction is used, are each subdivided to an intra-prediction mode decision. To this, for each of these prediction blocks, it is decided as to which supported intra-prediction mode should be used for the respective prediction block. These prediction blocks will form blocks 18 which are of interest here. Prediction blocks within coding blocks associated with inter-prediction would be treated differently by predictor 44. They would be inter-predicted from reference pictures by determining a motion vector and copying the prediction signal for this block from a location in the reference picture pointed to by the motion vector. Another block subdivisioning pertains the subdivisioning into transform blocks at units of which the transformations by transformer 32 and inverse transformer 40 are performed. Transformed blocks may, for instance, be the result of further subdivisioning coding blocks. Naturally, the examples set out herein should not be treated as being limiting and other examples exist as well. For the sake of completeness only, it is noted that the subdivisioning into coding blocks may, for instance, use multi-tree subdivisioning, and prediction blocks and/or transform blocks may be obtained by further subdividing coding blocks using multi-tree subdivisioning, as well.

Figure 3:
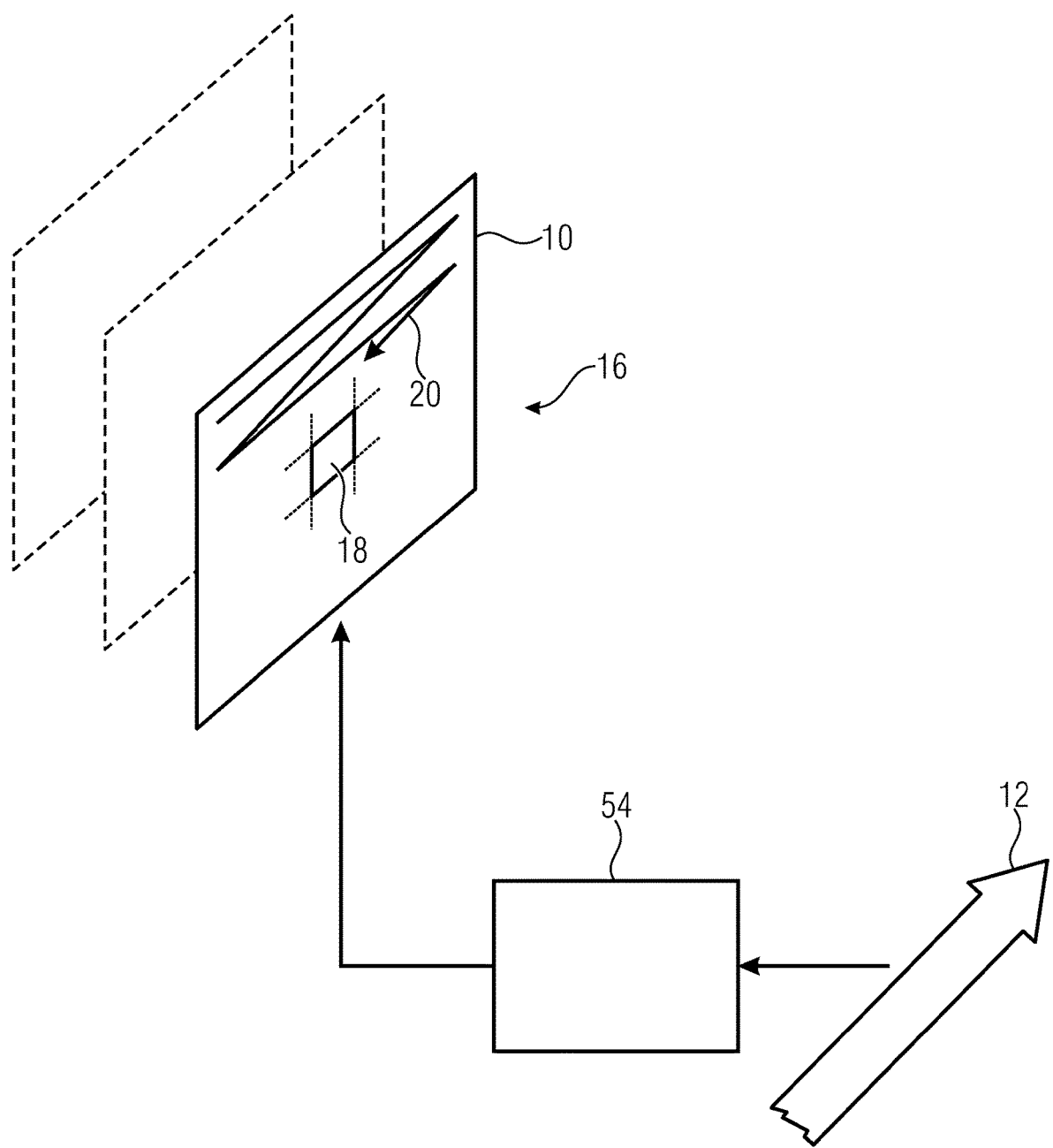
FIGS. 3 and 4 show decoder examples.

A decoder 54 or apparatus for block-wise decoding fitting to the encoder 14 of FIG. 1 is depicted in FIG. 3. This decoder 54 does the opposite of encoder 14, i.e. it decodes from datastream 12 picture 10 in a block-wise manner and supports, to this end, a plurality of intra-prediction modes. The decoder 54 may comprise a residual provider 156, for example. All the other possibilities discussed above with respect to FIG. 1 are valid for the decoder 54, too. To this, decoder 54 may be a still picture decoder or a video decoder and all the prediction modes and prediction possibilities are supported by decoder 54 as well. The difference between encoder 14 and decoder 54 lies, primarily, in the fact that encoder 14 chooses or selects coding decisions according to some optimization such as, for instance, in order to minimize some cost function which may depend on coding rate and/or coding distortion. One of these coding options or coding parameters may involve a selection of the intra-prediction mode to be used for a current block 18 among available or supported intra-prediction modes. The selected intra-prediction mode may then be signaled by encoder 14 for current block 18 within datastream 12 with decoder 54 redoing the selection using this signalization in datastream 12 for block 18. Likewise, the subdivisioning of picture 10 into blocks 18 may be subject to optimization within encoder 14 and corresponding subdivision information may be conveyed within datastream 12 with decoder 54 recovering the subdivision of picture 10 into blocks 18 on the basis of the subdivision information. Summarizing the above, decoder 54 may be a predictive decoder operating on a block-basis and besides intra-prediction modes, decoder 54 may support other prediction modes such as inter-prediction modes in case of, for instance, decoder 54 being a video decoder. In decoding, decoder 54 may also use the coding order 20 discussed with respect to FIG. 1 and as this coding order 20 is obeyed both at encoder 14 and decoder 54, the same neighboring samples are available for a current block 18 both at encoder 14 and decoder 54. Accordingly, in order to avoid unnecessary repetition, the description of the mode of operation of encoder 14 shall also apply to decoder 54 as far the subdivision of picture 10 into blocks is concerned, for instance, as far as prediction is concerned and as far as the coding of the prediction residual is concerned. Differences lie in the fact that encoder 14 chooses, by optimization, some coding options or coding parameters and signals within, or inserts into, datastream 12 the coding parameters which are then derived from the datastream 12 by decoder 54 so as to redo the prediction, subdivision and so forth.

Figure 4:
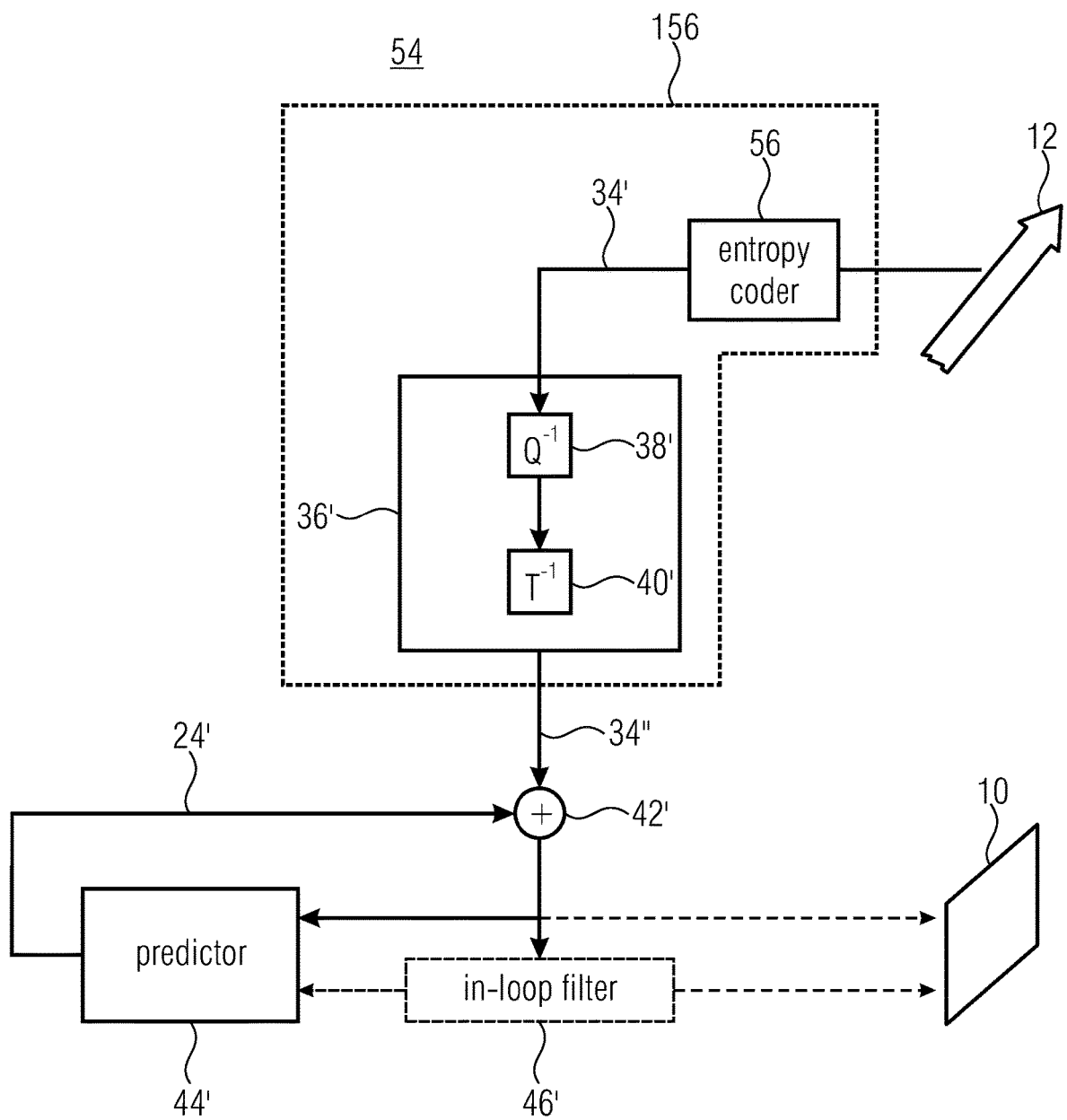

FIG. 4 shows a possible implementation of the decoder 54 of FIG. 3, namely one fitting to the implementation of encoder 14 of FIG. 1 as shown in FIG. 2. As many elements of the encoder 54 of FIG. 4 are the same as those occurring in the corresponding encoder of FIG. 2, the same reference signs, provided with an apostrophe, are used in FIG. 4 in order to indicate these elements. In particular, adder 42', optional in-loop filter 46' and predictor 44' are connected into a prediction loop in the same manner that they are in encoder of FIG. 2. The reconstructed, i.e. dequantized and retransformed prediction residual signal applied to adder 42' is derived by a sequence of entropy decoder 56 which inverses the entropy encoding of entropy encoder 28b, followed by the residual signal reconstruction stage 36' which is composed of dequantizer 38' and inverse transformer 40' just as it is the case on encoding side. The decoder's output is the reconstruction of picture 10. The reconstruction of picture 10 may be available directly at the output of adder 42' or, alternatively, at the output of in-loop filter 46'. Some post-filter may be arranged at the decoder's output in order to subject the reconstruction of picture 10 to some post-filtering in order to improve the picture quality, but this option is not depicted in FIG. 4.

Again, with respect to FIG. 4 the description brought forward above with respect to FIG. 2 shall be valid for FIG. 4 as well with the exception that merely the encoder performs the optimization tasks and the associated decisions with respect to coding options. However, all the description with respect to block-subdivisioning, prediction, dequantization and retransforming is also valid for the decoder 54 of FIG. 4.

2 ALWIP

Some non-limiting examples regarding ALWIP are herewith discussed, even if ALWIP is not always necessary to embody the techniques discussed here.

The present application is concerned, inter alia, with an improved intra-prediction mode concept for block-wise picture coding such as usable in a video codec such as HEVC or any successor of HEVC.

Intra-prediction modes are widely used in picture and video coding. In video coding, intra-prediction modes compete with other prediction modes such as inter-prediction modes such as motion-compensated prediction modes. In intra-prediction modes, a current block is predicted on the basis of neighboring samples, i.e. samples already encoded as far as the encoder side is concerned, and already decoded as far as the decoder side is concerned. Neighboring sample values are extrapolated into the current block so as to form a prediction signal for the current block with the prediction residual being transmitted in the datastream for the current block. The better the prediction signal is, the lower the prediction residual is and, accordingly, a lower number of bits is necessary to code the prediction residual.

In order to be effective, several aspects should be taken into account in order to form an effective frame work for intra-prediction in a block-wise picture coding environment. For instance, the larger the number of intra-prediction modes supported by the codec, the larger the side information rate consumption is in order to signal the selection to the decoder. On the other hand, the set of supported intra-prediction modes should be able to provide a good prediction signal, i.e. a prediction signal resulting in a low prediction residual.

An intra-prediction mode concept allowing for a more efficient compression of a block-wise picture codec if using the improved intra-prediction mode concept is sought.

This object is achieved, inter alia, by the so-called Affine Linear Weighted Intra Predictor (ALWIP) transformations. There is disclosed an apparatus (encoder or decoder) for block-wise decoding a picture from a data stream, the apparatus supporting at least one intra-prediction mode according to which the intra-prediction signal for a block of a predetermined size of the picture is determined by applying a first template of samples which neighbours the current block onto an affine linear predictor which, in the sequel, shall be called Affine Linear Weighted Intra Predictor (ALWIP).

The apparatus may have at least one of the following properties (the same may apply to a method or to another technique, e.g. implemented in a non-transitory storage unit storing instructions which, when executed by a processor, cause the processor to implement the method and/or to operate as the apparatus).

2.1 Proposed Predictors May be Complementary to Other Predictors

The intra-prediction modes supported by the apparatus are complementary to other intra prediction modes of the codec. Thus, they may be complementary to the DC-, Planar-, or Angular-Prediction modes defined in the HEVC codec resp. The JEM reference software. The latter three types of intra-prediction modes shall be called conventional intra prediction modes from now on. Thus, for a given block in intra mode, a flag needs to be parsed by the decoder which indicates whether one of the intra-prediction modes supported by the apparatus is to be used or not.

2.2 More than One Proposed Prediction Modes

The apparatus may contain more than one ALWIP mode. Thus, in case that the decoder knows that one of the ALWIP modes supported by the apparatus is to be used, the decoder needs to parse additional information that indicates which of the ALWIP modes supported by the apparatus is to be used.

The signalization of the mode supported may have the property that the coding of some ALWIP modes may use less bins than other ALWIP modes. Which of these modes use less bins and which modes use more bins may either depend on information that can be extracted from the already decoded bitstream or may be fixed in advance.

3 Some Aspects

FIG. 2 shows the decoder 54 for decoding a picture from a data stream 12. The decoder 54 may be configured to decode a predetermined block 18 of the picture. In particular, the predictor 44 may be configured for mapping a set of P neighboring samples neighboring the predetermined block 18 using a linear or affine linear transformation [e.g., ALWIP] onto a set of Q predicted values for samples of the predetermined block.

Figure 5:
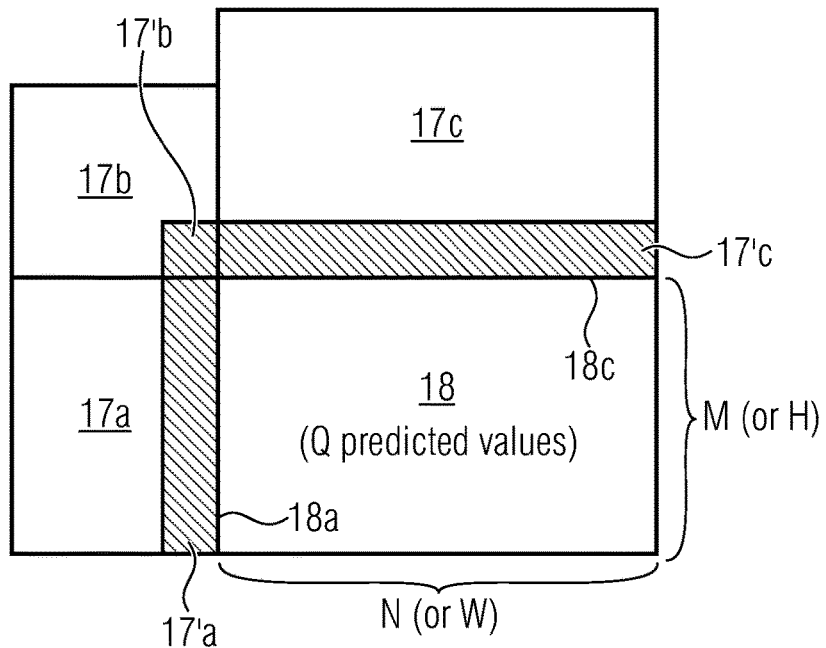
FIG. 5 shows a diagram of a prediction of a block.

As shown in FIG. 5, a predetermined block 18 comprises Q values to be predicted (which, at the end of the operations, will be "predicted values"). If the block 18 has M row and N columns, Q=M*N. The Q values of the block 18 may be in the spatial domain (e.g., pixels) or in the transform domain (e.g., DCT, Discrete Wavelet Transform, etc.). The Q values of the block 18 may be predicted on the basis of P values taken from the neighboring blocks 17a-17c, which are in general adjacent to the block 18. The P values of the neighboring blocks 17a-17c may be in the closest positions (e.g., adjacent) to the block 18. The P values of the neighboring blocks 17a-17c have already been processed and predicted. The P values are indicated as values in portions 17'a-17'c, to distinguish them from the blocks they are part of (in some examples, 17'b is not used).

Figure 6:
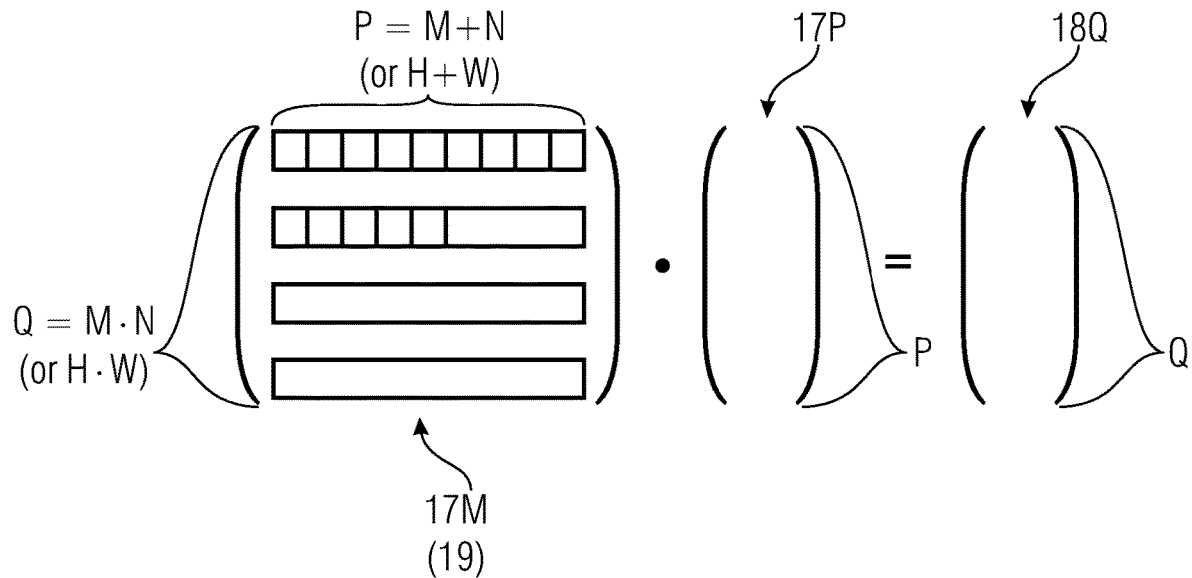
FIG. 6 shows a matrix operation.

As shown in FIG. 6, in order to perform the prediction, it is possible to operate with a first vector 17P with P entries (each entry being associated to a particular position in the neighboring portions 17'a-17'c), a second vector 18Q with Q entries (each entry being associated to a particular position in the block 18), and a mapping matrix 17M (each row being associated to a particular position in the block 18, each column being associated to a particular position in the neighboring portions 17'a-17'c). The mapping matrix 17M therefore performs the prediction of the P values of the neighboring portions 17'a-17'c into values of the block 18 according to a predetermined mode. The entries in the mapping matrix 17M may be therefore understood as weighting factors. In the following passages, we will refer to the neighboring portions of the boundary using the signs 17a-17c instead of 17'a-17'c.

In the art there are known several conventional modes, such as DC mode, planar mode and 65 directional prediction modes. There may be known, for example, 67 modes.

However, it has been noted that it is also possible to make use of different modes, which are here called linear or affine linear transformations. The linear or affine linear transformation comprises P*Q weighting factors, among which at least ¼ P*Q weighting factors are non-zero weighting values, which comprise, for each of the Q predicted values, a series of P weighting factors relating to the respective predicted value. The series, when being arranged one below the other according to a raster scan order among the samples of the predetermined block, form an envelope which is omnidirectionally non-linear.

Figures 12, 13:
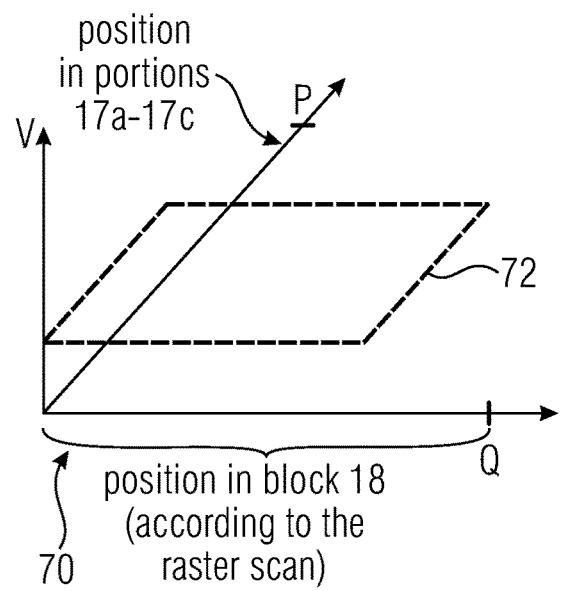
FIG. 12 shows a scheme associating the dimensions of the blocks to be predicted to prediction modes.
FIG. 13 shows a scheme useful to understand the invention.

FIG. 13 shows an example of a diagram 70 mapping the P positions of the neighboring values 17'a-17'c (template), the Q positions of the neighbouring samples 17'a-17'c, and at the values of the P*Q weighting factors of the matrix 17M. A plane 72 is an example of the envelope of the series for a DC transformation (which is a plane for the DC transformation). The envelope is evidently planar and therefore is excluded by the definition of the linear or affine linear transformation (ALWIP). Another example is a matrix resulting in an emulation of an angular mode: an envelope would be excluded from the ALWIP definition and would, frankly speaking, look like a hill leading obliquely from top to bottom along a direction in the P/Q plane. The planar mode and the 65 directional prediction modes would have different envelopes, which would however be linear in at least one direction, namely all directions for the exemplified DC, for example, and the hill direction for an angular mode, for example.

To the contrary, the envelope of the linear or affine transformation will not be omnidirectionally linear. It has been understood that such kind of transformation may be optimal, in some situations, for performing the prediction for the block 18. It has been noted that it is of advantage that at least ¼ of the weighting factors are different from zero (i.e., at least the 25% of the P*Q weighting factors are different from 0).

The weighting factors may be unrelated with each other according to any regular mapping rule. Hence, a matrix 17M may be such that the values of its entries have no apparent recognizable relationship. For example, the weighting factors cannot be described by any analytical or differential function.

In examples, an ALWIP transformation is such that a mean of maxima of cross correlations between a first series of weighting factors relating to the respective predicted value, and a second series of weighting factors relating to predicted values other than the respective predicted value, or a reversed version of the latter series, whatever leads to a higher maximum, may be lower than a predetermined threshold (e.g., 0.2 or 0.3 or 0.35 or 0.1, e.g., a threshold in a range between 0.05 and 0.035). For example, for each couple $(i_1, i_2)$ of rows of the ALWIP matrix 17M, a cross correlation may be calculated by multiplying the P values of the $i_1^{th}$ row with by the P values of the $i_2^{th}$ row. For each obtained cross correlation, the maximum value may be obtained. Hence, a mean (average) may be obtained for the whole matrix 17M (i.e. the maxima of the cross correlations in all combinations are averaged). After that, the threshold may be e.g., 0.2 or 0.3 or 0.35 or 0.1, e.g., a threshold in a range between 0.05 and 0.035.

The P neighboring samples of blocks 17a-17c may be located along a one-dimensional path extending along a border (e.g., 18c, 18a) of the predetermined block 18. For each of the Q predicted values of the predetermined block 18, the series of P weighting factors relating to the respective predicted value may be ordered in a manner traversing the one-dimensional path in a predetermined direction (e.g., from left to right, from top to down, etc.).

In examples, the ALWIP matrix 17M may be non-diagonal or non-block diagonal.

An example of ALWIP matrix 17M for predicting a 4×4 block 18 from 4 already predicted neighboring samples may be:

{
{37, 59, 77, 28},
{32, 92, 85, 25},
{31, 69, 100, 24},
{33, 36, 106, 29},
{24, 49, 104, 48},
{24, 21, 94, 59},
{29, 0, 80, 72},
{35, 2, 66, 84},
{32, 13, 35, 99},
{39, 11, 34, 103},
{45, 21, 34, 106},
{51, 24, 40, 105},
{50, 28, 43, 101},
{56, 32, 49, 101},
{61, 31, 53, 102},
{61, 32, 54, 100}
}.

(Here, {37, 59, 77, 28} is the first row; {32, 92, 85, 25} is the second row; and {61, 32, 54, 100} is the $16^{th}$ row of the matrix 17M.) Matrix 17M has dimension 16×4 and includes 64 weighting factors (as a consequence of 16*4=64). This is because matrix 17M has dimension Q×P, where Q=M*N, which is the number of samples of the block 18 to be predicted (block 18 is a 4×4 block), and P is the number of samples of the already predicted samples. Here, M=4, N=4, Q=16 (as a consequence of M*N=4*4=16), P=4. The matrix is non-diagonal and non-block diagonal, and is not described by a particular rule.

As can be seen, less than ¼ of the weighting factors are 0 (in the case of the matrix shown above, one weighting factor out of sixty-four is zero). The envelope formed by these values, when arranged one below the other one according to a raster scan order, form an envelope which is omnidirectionally non-linear.

Even if the explanation above is mainly discussed with reference to a decoder (e.g., the decoder 54), the same may be performed at the encoder (e.g., encoder 14).

In some examples, for each block size (in the set of block sizes), the ALWIP transformations of intra-prediction modes within the second set of intra-prediction modes for the respective block size are mutually different. In addition or alternatively, a cardinality of the second set of intra-prediction modes for the block sizes in the set of block sizes may coincide, but the associated linear or affine linear transformations of intra-prediction modes within the second set of intra-prediction modes for different block sizes may be non-transferable onto each other by scaling.

In some examples the ALWIP transformations may be defined in such a way that they have "nothing to share" with conventional transformations (e.g., the ALWIP transformations may have "nothing" to share with the corresponding conventional transformations, even though they have been mapped via one of the mappings above).

In examples, ALWIP modes are used for both luma components and chroma components, but in other examples ALWIP modes are used for luma components but are not used for chroma components.

4 Affine Linear Weighted Intra Prediction Modes with Encoder Speedup (e.g., Test CE3-1.2.1:)

4.1 Description of a Method or Apparatus

Affine linear weighted intra prediction (ALWIP) modes tested in CE3-1.2.1 may be the same as proposed in JVET-L0199 under test CE3-2.2.2, except for the following changes:

Harmonization with multiple reference line (MRL) intra prediction, especially encoder estimation and signaling, i.e. MRL is not combined with ALWIP and transmitting an MRL index is restricted to non-ALWIP blocks.

Subsampling now mandatory for all blocks W×H≥32×32 (was optional for 32×32 before); therefore, the additional test at the encoder and sending the subsampling flag has been removed.

ALWIP for 64×N and N×64 blocks (with N≤32) has been added by downsampling to 32×N and N×32, respectively, and applying the corresponding ALWIP modes.

Moreover, test CE3-1.2.1 includes the following encoder optimizations for ALWIP:

Combined mode estimation: conventional and ALWIP modes use a shared Hadamard candidate list for full RD estimation, i.e. the ALWIP mode candidates are added to the same list as the conventional (and MRL) mode candidates based on the Hadamard cost.

EMT intra fast and PB intra fast are supported for the combined mode list, with additional optimizations for reducing the number of full RD checks.

Only MPMs of available left and above blocks are added to the list for full RD estimation for ALWIP, following the same approach as for conventional modes.

4.2 Complexity Assessment

In Test CE3-1.2.1, excluding computations invoking the Discrete Cosine Transform, at most 12 multiplications per sample were needed to generate the prediction signals. Moreover, a total number of 136492 parameters, each in 16 bits, were used. This corresponds to 0.273 Megabyte of memory.

4.3 Experimental Results

Evaluation of the test was performed according to the common test conditions JVET-J1010 [2], for the intra-only (AI) and random-access (RA) configurations with the VTM software version 3.0.1. The corresponding simulations were conducted on an Intel Xeon cluster (E5-2697A v4, AVX2 on, turbo boost off) with Linux OS and GCC 7.2.1 compiler.

TABLE 1

Result of CE3-1.2.1 for VTM AI configuration

| | Y | U | V | enc time | dec time |
|---|---|---|---|---|---|
| Class A1 | −2.08% | −1.68% | −1.60% | 155% | 104% |
| Class A2 | −1.18% | −0.90% | −0.84% | 153% | 103% |
| Class B | −1.18% | −0.84% | −0.83% | 155% | 104% |
| Class C | −0.94% | −0.63% | −0.76% | 148% | 106% |
| Class E | −1.71% | −1.28% | −1.21% | 154% | 106% |
| Overall | −1.36% | −1.02% | −1.01% | 153% | 105% |
| Class D | −0.99% | −0.61% | −0.76% | 145% | 107% |
| Class F (optional) | −1.38% | −1.23% | −1.04% | 147% | 104% |

TABLE 2

Result of CE3-1.2.1 for VTM RA configuration

| | Y | U | V | enc time | dec time |
|---|---|---|---|---|---|
| Class A1 | −1.25% | −1.80% | −1.95% | 113% | 100% |
| Class A2 | −0.68% | −0.54% | −0.21% | 111% | 100% |
| Class B | −0.82% | −0.72% | −0.97% | 113% | 100% |
| Class C | −0.70% | −0.79% | −0.82% | 113% | 99% |
| Class E | | | | | |
| Overall | −0.85% | −0.92% | −0.98% | 113% | 100% |
| Class D | −0.65% | −1.06% | −0.51% | 113% | 102% |
| Class F (optional) | −1.07% | −1.04% | −0.96% | 117% | 99% |

5.4 Test CE3-1.2.2: Affine Linear Weighted Intra Prediction with Complexity Reduction The technique tested in CE2 is related to "Affine Linear Intra Predictions" described in JVET-L0199 [1], but simplifies it in terms of memory requirements and computational complexity:

There may be only three different sets of prediction matrices (e.g. $S_0$, $S_1$, $S_2$, see also below) and bias vectors (e.g. for providing offset values) covering all block shapes. As a consequence, the number of parameters is reduced to 1440010-bit values, which is less memory than stored in a 128×128 CTU.

The input and output size of the predictors is further reduced. Moreover, instead of transforming the boundary via DCT, averaging or downsampling may be performed to the boundary samples and the generation of the prediction signal may use linear interpolation instead of the inverse DCT. Consequently, a maximum of four multiplications per sample may result necessary for generating the prediction signal.

6. Examples

It is here discussed how to perform some predictions (e.g., as shown in FIG. 6) with ALWIP predictions.

In principle, with reference to FIG. 6, in order to obtain the Q=M*N values of a M×N block 18 to be predicted, multiplications of the Q*P samples of the Q×P ALWIP prediction matrix 17M by the P samples of the P×1 neighboring vector 17P should be performed. Hence, in general, in order to obtain each of the Q=M*N values of the M×N block 18 to be predicted, at least P=M+N value multiplications are necessary.

These multiplications have extremely unwanted effects. The dimension P of the boundary vector 17P is in general dependent on the number M+N of boundary samples (bins or pixels) 17a, 17c neighbouring (e.g. adjacent to) the M×N block 18 to be predicted. This means that, if the size of block 18 to be predicted is large, the number M+N of boundary pixels (17a, 17c) is accordingly large, hence increasing the dimension P=M+N of the P×1 boundary vector 17P, and the length of each row of the Q×P ALWIP prediction matrix 17M, and accordingly, also the numbers of multiplications necessary (in general terms, Q=M*N=W*H, where W (Width) is another symbol for N and H (Height) is another symbol for M; P, in the case that the boundary vector is only formed by one row and/or one column of samples, is P=M+N=H+W).

This problem is, in general, exacerbated by the fact that in microprocessor-based systems (or other digital processing systems), multiplications are, in general, power-consuming operations. It may be imagined that a large number of multiplications carried for an extremely high number of samples for a large number of blocks causes a waste of computational power, which is in general unwanted.

Accordingly, it would be of advantage to reduce the number Q*P of multiplications necessary for predicting the M×N block 18.

It has been understood that it is possible to somehow reduce the computational power necessary for each intra-prediction of each block 18 to be predicted by intelligently choosing operations alternative to multiplications and which are easier to be processed.

In particular, with reference to FIGS. 7.1-7.4, 8.1, and 8.2, it has been understood that an encoder or decoder may predict a predetermined block (e.g. 18) of the picture using a plurality of neighbouring samples (e.g. 17a, 17c), by reducing (e.g. at step 811), (e.g. by averaging or downsampling), the plurality of neighbouring samples (e.g. 17a, 17c) to obtain a reduced set of samples values lower, in number of samples, than compared to the plurality of neighbouring samples, subjecting (e.g. at step 812) the reduced set of sample values to a linear or affine linear transformation to obtain predicted values for predetermined samples of the predetermined block.

In some cases, the decoder or encoder may also derive (e.g. step 813 in FIG. 8.1), e.g. by interpolation, prediction values for further samples of the predetermined block on the basis of the predicted values for the predetermined samples and the plurality of neighboring samples. Accordingly, an upsampling strategy may be obtained.

In examples, it is possible to perform (e.g. at step 811) some averages on the samples of the boundary 17, so as to arrive at a reduced set 102 (FIGS. 7.1-7.4) of samples with a reduced number of samples (at least one of the samples of the reduced number of samples 102 may be the average of two samples of the original boundary samples, or a selection of the original boundary samples). For example, if the original boundary has P=M+N samples, the reduced set of samples may have $P_{red}=M_{red}+N_{red}$) with at least one of $M_{red}<M$ and $N_{red}<N$, so that $P_{red}<P$. Hence, the boundary vector 17P which will be actually used for the prediction (e.g. at step 812b) will not have P×1 entries, but $P_{red}×1$ entries, with $P_{red}<P$. Analogously, the ALWIP prediction matrix 17M chosen for the prediction will not have Q×P dimension, but $Q×P_{red}$ (or $Q_{red}×P_{red}$, see below) with a reduced number of elements of the matrix at least because $P_{red}<P$ (by virtue of at least one of $M_{red}<M$ and $N_{red}<N$).

In some examples (e.g. FIGS. 7.2, 7.3, and 8.2), it is even possible to further reduce the number of multiplications, if the block obtained by ALWIP (at step 812) is a reduced block having size $M'_{red}×N'_{red}$, with $M'_{red}<M$ and/or $N'_{red}<N$ (i.e. the samples directly predicted by ALWIP are less in number than the samples of the block 18 to be actually predicted). Thus, setting $Q_{red}=M'_{red}*N'_{red}$, this will bring to obtain an ALWIP prediction by using, instead of $Q*P_{red}$ multiplications, $Q_{red}*P_{red}$ multiplications (with $Q_{red}*P_{red}<Q*P_{red}<Q*P$). This multiplication will predict a reduced block, with dimension $M'_{red}×N'_{red}$. It will be notwithstanding possible to perform (e.g. at a subsequent step 813) an upsampling (e.g., obtained by interpolation) from the reduced $M'_{red}×N'_{red}$ predicted block into the final M×N predicted block.

These techniques may be advantageous since, while the matrix multiplication involves a reduced number ($Q_{red}*P_{red}$ or $Q*P_{red}$) of multiplications, both the initial reducing (e.g., averaging or downsampling) and the final transformation (e.g. interpolation) may be performed by reducing (or even avoiding) multiplications. For example, downsampling, averaging and/or interpolating may be performed (e.g. at steps 811 and/or 813) by adopting non-computationally-power-demanding binary operations such as additions and shifting.

An example of shift operation at a processor level is here discussed. FIG. 9 shows the number 580 encoded in binary (1001000100b) in a ten-bit register 910, the ten-bit register 910 having 10 bit registers 910a, each bit register 910a storing one bit value (e.g., 1 or 0). The value 1001000100b expressed in binary, encoded in the two-byte register 910, is indicated in FIG. 9a as 901 as "value to be shifted". The binary value indicated with numeral 902 in FIG. 9b is a right-shifted version of the binary value indicated with numeral 901. As can be seen, the binary value 902 (encoded as 0100100010b) is a version of the binary value 901 after that each value encoded in each bit register 910a has been simply moved to the bit register in the respective right position; the less significant bit of the binary value 901 is lost in the binary value 902; and the most significant bit of the shifted binary value 902 is added as zero. If we transform into decimal the shifted binary value 902, we see that we have obtained the decimal value 290, which is the half of 580. This may be a technique for dividing a binary number by two (there is only a quantization error in case the value 901 is odd). This operation is extremely easy to be performed and does not require high computational power. Notably, by shifting for a plural number of times, divisions by powers of 2 are obtained: e.g. by shifting twice, a division by 4 is obtained; by shifting three times, a division by 8 is obtained, and in general by shifting r times, a division by $2^r$ (2^r) is obtained. This may be also indicated with the notation f>>r, so that f>>1 indicates f/2, f>>2 indicates f/4, and so on (with f an integer number). This operation is also known as right rotation. Analogously, the left-rotation operation f<<r implies the multiplication of f by $2^r$ (or 2^r). The shifting operations are not, for processors, computationally-power-demanding, as they avoid the necessity of performing multiplications, but are simply obtained by moving bits in different registers. In the example, the register 910 is represented as a 10-bit register. However, in examples, the register 910 may have a different number of bit registers 910a, e.g. 8 bit-register 910 (in that case, the register 910 is an 8-bit register).

Also, the addition is an extremely easy operation which can be easily performed without much computational effort.

This shifting operation may be used, for example, for averaging two boundary samples and/or for interpolating two samples (support values) of the reduced predicted block (or taken from the boundary), to obtain the final predicted block. (For interpolation two sample values are necessary. Within the block we always have two predetermined values, but for interpolating the samples along the left and above border of the block we only have one predetermined value, as in FIG. 7.2, therefore we use a boundary sample as a support value for interpolation.)

A two-step procedure may be used, such as:
first summing the values of the two samples;
then halving (e.g., by right-shifting) the value of the sum.
Alternatively, it is possible to:
first halving (e.g., by left-shifting) the each of the samples;
then summing the values of the two halved samples.

Even easier operations may be performed when downsampling (e.g., at step 811), as it is only necessary to select one sample amount a group of samples (e.g., samples adjacent to each other).

Hence, it is now possible to define technique(s) for reducing the number of multiplications to be performed. Some of these techniques may be based, inter alia, on at least one of the following principles:

Even if the block 18 to be actually predicted has size M×N, block may be reduced (in at least one of the two dimensions) and an ALWIP matrix with reduced size $Q_{red} \times P_{red}$ (with $Q_{red}=M'_{red}*N'_{red}$, $P_{red}=N_{red}+M_{red}$, With $M'_{red}<M$ and/or $N'_{red}<N$ and/or $M_{red}<M$ and/or $N_{red}<N$) may be applied. Hence, the boundary vector 17P will have size $P_{red} \times 1$, implying only $P_{red}<P$ multiplications (with $P_{red}=M_{red}+N_{red}$ and P=M+N).

The $P_{red} \times 1$ boundary vector 17P may be obtained easily from the original boundary 17, e.g.:
By downsampling (e.g. by choosing only some samples of the boundary); and/or
By averaging multiple samples of the boundary (which may be easily obtained by addition and shifting, without multiplications).

In addition or alternatively, instead of predicting by multiplication all the Q=M*N values of the block 18 to be predicted, it is possible to only predict a reduced block with reduced dimensions (e.g., $Q_{red}=M'_{red}*N'_{red}$ with $M'_{red}<M$ and/or $N'_{red}<N$). The remaining $Q_{red}$ samples of the block 18 to be predicted will be obtained by interpolation, e.g. using the samples as support values for the remaining $Q-Q_{red}$ values to be predicted.

An example is provided by FIG. 8.1 which may be understood as generally describing a process 810, a particular case of which is illustrated in FIG. 7.1. In this case, a 4×4 block 18 (M=4, N=4, Q=M*N=16) is to be predicted and a neighborhood 17 of samples 17a (a vertical row column with four already-predicted samples) and 17c (a horizontal row with four already-predicted samples) have already been predicted at previous iterations (the neighborhoods 17a and 17c may be collectively indicated with 17). A priori, by using the equation shown in FIG. 5, the prediction matrix 17M should be a Q×P=16×8 matrix (by virtue of Q=M*N=4*4 and P=M+N=4+4=8), and the boundary vector 17P should have 8×1 dimension (by virtue of P=8). However, this would drive to the necessity of performing 8 multiplications for each of the 16 samples of the 4×4 block 18 to be predicted, hence leading to the necessity of performing 16*8=128 multiplications in total. (It is noted that the average number of multiplications per sample is a good assessment of the computational complexity. For conventional intra-predictions, four multiplications per sample are used and this increases the computational effort to be involved. Hence, it is possible to use this as an upper limit for ALWIP would ensures that the complexity is reasonable and does not exceed the complexity of conventional intra prediction.)

Notwithstanding, it has been understood that, by using the present technique, it is possible to reduce, at step 811, the number of samples 17a and 17c neighboring the block 18 to be predicted from P to $P_{red}<P$. In particular, it has been understood that it is possible to average (e.g. at 100 in FIG. 7.1) boundary samples (17a, 17c) which are adjacent to each other, to obtain a reduced boundary 102 with two horizontal rows and two vertical columns, hence operating as the block 18 were a 2×2 block (the reduced boundary being formed by averaged values). Alternatively, it is possible to perform a downsampling, hence selecting two samples for the row 17c and two samples for the column 17a. Hence, the horizontal row 17c, instead of having the four original samples, is processed as having two samples (e.g. averaged samples), while the vertical column 17a, originally having four samples, is processed as having two samples (e.g. averaged samples). It is also possible to understand that, after having subdivided the row 17c and the column 17a in groups 110 of two samples each, one single sample is maintained (e.g., the average of the samples of the group 110 or a simple choice among the samples of the group 110). Accordingly, a so-called reduced set 102 of sample values is obtained, by virtue of the set 102 having only four samples ($M_{res}=2$, $N_{red}=2$, $P_{red}=M_{red}+N_{red}=4$, with $P_{red}<P$).

It has been understood that it is possible to perform operations (such as the averaging or downsampling 100) without carrying out too many multiplications at the processor-level: the averaging or downsampling 100 performed at step 811 may be simply obtained by the straightforward and computationally-non-power-consuming operations such as additions and shifts.

It has been understood that, at this point, it is possible to subject the reduced set of sample values 102 to a linear or affine linear (ALWIP) transformation 19 (e.g., using a prediction matrix such as the matrix 17M of FIG. 5). In this case, the ALWIP transformation 19 directly maps the four samples 102 onto the sample values 104 of the block 18. No interpolation is necessary in the present case.

In this case, the ALWIP matrix 17M has dimension $Q \times P_{red}=16 \times 4$: this follows the fact that all the Q=16 samples of the block 18 to be predicted are directly obtained by ALWIP multiplication (no interpolation needed).

Hence, at step 812a, a suitable ALWIP matrix 17M with dimension $Q \times P_{red}$ is selected. The selection may at least partially be based, for example, on signalling from the datastream 12. The selected ALWIP matrix 17M may also be indicated with $A_k$, where k may be understood as an index, which may be signalled in the datastream 12 (in some cases the matrix is also indicated as $A_{idx}^m$, see below). The selection may be performed according to the scheme illustrated in FIG. 12: for each dimension (e.g., pair of height/width of the block 18 to be predicted), an ALWIP matrix 17M is chosen among, for example, one of the three sets of matrixes $S_0$, $S_1$, $S_2$ (each of the three sets $S_0$, $S_1$, $S_2$ may group a plurality of ALWIP matrixes 17M of the same dimensions, and the ALWIP matrix to be chosen for the prediction will be one of them).

At step 812b, a multiplication between the selected $Q \times P_{red}$ ALWIP matrix 17M (also indicated as $A_k$) and the $P_{red} \times 1$ boundary vector 17P is performed.

At step 812c, an offset value (e.g., $b_k$) may be added, e.g. to all the obtained values 104 of the vector 18Q obtained by ALWIP. The value of the offset ($b_k$ or in some cases also indicated with $b_{1,2,3}{}^i$, see below) may be associated to the particular selected ALWIP matrix ($A_k$), and may be based on an index (e.g., which may be signalled in the datastream 12).

Hence, a comparison between using the present technique and non-using the present technique is here resumed:

Without the present technique:
Block 18 to be predicted, the block having dimensions M=4, N=4;
Q=M*N=4*4=16 values to be predicted;
P=M+N=4+4=8 boundary samples
P=8 multiplications for each of the Q=16 values to be predicted,
a total number of P*Q=8*16=128 multiplications;

With the present technique, we have:
Block 18 to be predicted, the block having dimensions M=4, N=4;
Q=M*N=4*4=16 values to be predicted at the end;
Reduced dimension of the boundary vector: $P_{red}=M_{red}=N_{red}=2+2=4$;
$P_{red}=4$ multiplications for each of the Q=16 values to be predicted by ALWIP,
a total number of $P_{red}*Q=4*16=64$ multiplications (the half of 128!)
the ratio between the number of multiplications and the number of final values to be obtained and is $P_{red}*Q/Q=4$, i.e. the half than the P=8 multiplications for each sample to be predicted!

As can be understood, by relying on straightforward and computationally-non-power-demanding operations such as averaging (and, in case, additions and/or shifts and/or downsampling) it is possible to obtain an appropriate value at step 812.

With reference to FIGS. 7.2 and 8.2, the block 18 to be predicted is here an 8×8 block (M=8, N=8) of 64 samples. Here, a priori, a prediction matrix 17M should have size Q×P=64×16 (Q=64 by virtue of Q=M*N=8*8=64, M=8 and N=8 and by virtue of P=M+N=8+8=16). Hence, a priori, there would be needed P=16 multiplications for each of the Q=64 samples of the 8×8 block 18 to be predicted, to arrive at 64*16=1024 multiplications for the whole 8×8 block 18!

However, as can be seen in FIGS. 7.2 and 8.2, there can be provided a method 820 according to which, instead of using all the 16 samples of the boundary, only 8 values (e.g., 4 in the horizontal boundary row 17c and 4 in the vertical boundary column 17a between original samples of the boundary) are used. From the boundary row 17c, 4 samples may be used instead of 8 (e.g., they may be two-by-two averages and/or selections of one sample out of two). Accordingly, the boundary vector is not a P×1=16×1 vector, but a $P_{red} \times 1 = 8 \times 1$ vector only ($P_{red}=M_{red}+N_{red}=4+4$). It has been understood that it is possible to select or average (e.g., two by two) samples of the horizontal row 17c and samples of the vertical columns 17a to have, instead of the original P=16 samples, only red $P_{red}=8$ boundary values, forming the reduced set 102 of sample values. This reduced set 102 will permit to obtain a reduced version of block 18, the reduced version having $Q_{red}=M_{red}*N_{red}=4*4=16$ samples (instead of Q=M*N=8*8=64). It is possible to apply an ALWIP matrix for predicting a block having size $M_{red} \times N_{red}=4 \times 4$. The reduced version of block 18 includes the samples indicated with grey in the scheme 106 in FIG. 7.2: the samples indicated with grey squared (including samples 118' and 118") form a 4×4 reduced block with $Q_{red}=16$ values obtained at the step of subjecting 812. The 4×4 reduced block has been obtained by applying the linear transformation 19 at the step of subjecting 812. After having obtain the values of the 4×4 reduced block, it is possible to obtain the values of the remaining samples (samples indicated with white samples in the scheme 106) for example by interpolation.

In respect to method 810 of FIGS. 7.1 and 8.1, this method 820 may additionally include a step 813 of deriving, e.g. by interpolation, prediction values for the remaining $Q-Q_{red}=64-16=48$ samples (white squares) of the M×N=8×8 block 18 to be predicted. The remaining $Q-Q_{red}=64-16=48$ samples may be obtained from the $Q_{red}=16$ directly obtained samples by interpolation (the interpolation may also make use of values of the boundary samples, for example). As can be seen in FIG. 7.2, while the samples 118' and 118" have been obtained at step 812 (as indicated by the grey square), the sample 108' (intermediate to the samples 118' and 118" and indicated with white square) is obtained by interpolation between the sample 118' and 118" at step 813. It has been understood that interpolations may also be obtained by operations similar to those for averaging such as shifting and adding. Hence, in FIG. 7.2, the value 108' may in general be determined as a value intermediate between the value of the sample 118' and the value of the sample 118" (it may be the average).

By performing interpolations, at step 813 it is also possible to arrive at the final version of the M×N=8×8 block 18 based on multiple sample values indicated in 104.

Hence, a comparison between using the present technique and non-using it is:

Without the present technique:
Block 18 to be predicted, the block having dimensions M=8, N=8 and
Q=M*N=8*8=64 samples in the block 18 to be predicted;
P=M+N=8+8=16 samples in the boundary 17;
P=16 multiplications for each of the Q=64 values to be predicted,
a total number of P*Q=16*64=1028 multiplications
the ratio between the number of multiplications and the number of final values to be obtained is P*Q/Q=16

With the present technique:
Block 18 to be predicted, having dimensions M=8, N=8
Q=M*N=8*8=64 values to be predicted at the end;
but an $Q_{red} \times P_{red}$ ALWIP matrix to be used, with $P_{red}=M_{red}+N_{red}$, $Q_{red}=M_{red}*N_{red}$, $M_{red}=4$, $N_{red}=4$
$P_{red}=M_{red}+N_{red}=4+4=8$ samples in the boundary, with $P_{red}<P$
$P_{red}=8$ multiplications for each of the $Q_{red}=16$ values of the 4×4 reduced block to be predicted (formed by grey squares in scheme 106),
a total number of $P_{red}*Q_{red}=8*16=128$ multiplications (much less than 1024!)
the ratio between the number of multiplications and the number of final values to be obtained is $P_{red}*Q_{red}/Q=128/64=2$ (much less than the 16 obtained without the present technique!).

Accordingly, the herewith presented technique is 8 times less power-demanding than the previous one.

FIG. 7.3 shows another example (which may be based on the method 820), in which the block 18 to be predicted is a rectangular 4×8 block (M=8, N=4) with Q=4*8=32 samples to be predicted. The boundary 17 is formed by the horizontal row 17c with N=8 samples and the vertical column 17a with M=4 samples. Hence, a priori, the boundary vector 17P would have dimension P×1=12×1, while the prediction ALWIP matrix should be a Q×P=32×12 matrix, hence causing the need of Q*P=32*12=384 multiplications.

However, it is possible, for example, to average or downsample at least the 8 samples of the horizontal row 17c, to obtain a reduced horizontal row with only 4 samples (e.g., averaged samples). In some examples, the vertical column 17a would remain as it is (e.g. without averaging). In total, the reduced boundary would have dimension $P_{red}$=8, with $P_{red}$<P. Accordingly, the boundary vector 17P will have dimension $P_{red}$×1=8×1. The ALWIP prediction matrix 17M will be a matrix with dimensions $M*N_{red}*P_{red}$=4*4*8=64. The 4×4 reduced block (formed by the grey columns in the schema 107), directly obtained at the subjecting step 812, will have size $Q_{red}=M*N_{red}$=4*4=16 samples (instead of the Q=4*8=32 of the original 4×8 block 18 to be predicted). Once the reduced 4×4 block is obtained by ALWIP, it is possible to add an offset value $b_k$ (step 812c) and to perform interpolations at step 813. As can be seen at step 813 in FIG. 7.3, the reduced 4×4 block is expanded to the 4×8 block 18, where the values 108', non-obtained at step 812, are obtained at step 813 by interpolating the values 118' and 118" (grey squares) obtained at step 812.

Hence, a comparison between using the present technique and non-using it is:
  Without the present technique:
    Block 18 to be predicted, the block having dimensions M=4, N=8
    Q=M*N=4*8=32 values to be predicted;
    P=M+N=4+8=12 samples in the boundary;
    P=12 multiplications for each of the Q=32 values to be predicted,
    a total number of P*Q=12*32=384 multiplications
    the ratio between the number of multiplications and the number of final values to be obtained is P*Q/Q=12
  With the present technique:
    Block 18 to be predicted, the block having dimensions M=4, N=8
    Q=M*N=4*8=32 values to be predicted at the end;
    but a $Q_{red}×P_{red}$ 16×8 ALWIP matrix ca be used, with M=4, $N_{red}$=4, $Q_{red}=M*N_{red}$=16, $P_{red}=M+N_{red}$=4+4=8
    $P_{red}=M+N_{red}$=4+4=8 samples in the boundary, with $P_{red}$<P
    $P_{red}$=8 multiplications for each of the $Q_{red}$=16 values of the reduced block to be predicted,
    a total number of $Q_{red}*P_{red}$=16*8=128 multiplications (less than 384!)
    the ratio between the number of multiplications and the number of final values to be obtained is $P_{red}*Q_{red}$/Q=128/32=4 (much less than the 12 obtained without the present technique!).

Hence, with the present technique, the computational effort is reduced to one third.

FIG. 7.4 shows a case of a block 18 to be predicted with dimensions M×N=16×16 and having Q=M*N=16*16=256 values to be predicted at the end, with P=M+N=16+16=32 boundary samples. This would lead to a prediction matrix with dimensions Q×P=256×32, which would imply 256*32=8192 multiplications!

However, by applying the method 820, it is possible, at step 811, to reduce (e.g. by averaging or downsampling) the number of boundary samples, e.g., from 32 to 8: for example, for every group 120 of four consecutive samples of the row 17a, one single sample (e.g., selected among the four samples, or the average of the samples) remains. Also for every group of four consecutive samples of the column 17c, one single sample (e.g., selected among the four samples, or the average of the samples) remains.

Here, the ALWIP matrix 17M is a $Q_{red}×P_{red}$=64×8 matrix: this comes from the fact that it has been chosen $P_{red}$=8 (by using 8 averaged or selected samples from the 32 ones of the boundary) and by the fact that the reduced block to be predicted at step 812 is an 8×8 block (in the scheme 109, the grey squares are 64).

Hence, once the 64 samples of the reduced 8×8 block are obtained at step 812, it is possible to derive, at step 813, the remaining $Q-Q_{red}$=256−64=192 values 104 of the block 18 to be predicted.

In this case, in order to perform the interpolations, it has been chosen to use all the samples of the boundary column 17a and only alternate samples in the boundary row 17c. other choices may be made.

While with the present method the ratio between the number of multiplications and the number of finally obtained values is $Q_{red}*P_{red}$/Q=8*64/256=2, which is much less than the 32 multiplications for each value without the present technique!

A comparison between using the present technique and non-using it is:
  Without the present technique:
    Block 18 to be predicted, the block having dimensions M=16, N=16
    Q=M*N=16*16=256 values to be predicted;
    P=M+N=16*16=32 samples in the boundary;
    P=32 multiplications for each of the Q=256 values to be predicted,
    a total number of P*Q=32*256=8192 multiplications;
    the ratio between the number of multiplications and the number of final values to be obtained is P*Q/Q=32
  With the present technique:
    Block 18 to be predicted, the block having dimensions M=16, N=16
    Q=M*N=16*16=256 values to be predicted at the end;
    but a $Q_{red}×P_{red}$=64×8 ALWIP matrix to be used, with $M_{red}$=4, $N_{red}$=4, $Q_{red}$=8*8=64 samples to be predicted by ALWIP, $P_{red}=M_{red}+N_{red}$=4+4=8
    $P_{red}=M_{red}+N_{red}$=4+4=8 samples in the boundary, with $P_{red}$<P
    $P_{red}$=8 multiplications for each of the $Q_{red}$=64 values of the reduced block to be predicted,
    a total number of $Q_{red}*P_{red}$=64*4=256 multiplications (less than 8192!)
    the ratio between the number of multiplications and the number of final values to be obtained is $P_{red}*Q_{red}$/Q=8*64/256=2 (much less than the 32 obtained without the present technique!).

Accordingly, the computational power used by the present technique is 16 times less than the traditional technique!

Therefore, it is possible to predict a predetermined block (18) of the picture using a plurality of neighbouring samples (17) by
  reducing (100, 813) the plurality of neighbouring samples to obtain a reduced set (102) of samples values lower, in number of samples, than compared to the plurality of neighbouring samples (17),
  subjecting (812) the reduced set of sample values (102) to a linear or affine linear transformation (19, 17M) to obtain predicted values for predetermined samples (104, 118', 188") of the predetermined block (18).

In particular, it is possible to perform the reducing (100, 813) by downsampling the plurality of neighbouring samples to obtain the reduced set (102) of samples values lower, in number of samples, than compared to the plurality of neighbouring samples (17).

Alternatively, it is possible to perform the reducing (100, 813) by averaging the plurality of neighbouring samples to obtain the reduced set (102) of samples values lower, in number of samples, than compared to the plurality of neighbouring samples (17).

Further, it is possible to derive (813), by interpolation, prediction values for further samples (108, 108') of the predetermined block (18) on the basis of the predicted values for the predetermined samples (104, 118', 118") and the plurality of neighbouring samples (17).

The plurality of neighbouring samples (17a, 17c) may extend one-dimensionally along two sides (e.g. towards right and toward below in FIGS. 7.1-7.4) of the predetermined block (18). The predetermined samples (e.g. those which are obtained by ALWIP in step 812) may also be arranged in rows and columns and, along at least one of the rows and columns, the predetermined samples may be positioned at every $n^{th}$ position from a sample (112) of the predetermined sample 112 adjoining the two sides of the predetermined block 18.

Based on the plurality of neighbouring samples (17), it is possible to determine for each of the at least one of the rows and the columns, a support value (118) for one (118) of the plurality of neighbouring positions, which is aligned to the respective one of the at least one of the rows and the columns. It is also possible to derive, by interpolation, the prediction values 118 for the further samples (108, 108') of the predetermined block (18) on the basis of the predicted values for the predetermined samples (104, 118', 118") and the support values for the neighbouring samples (118) aligned to the at least one of rows and columns.

The predetermined samples (104) may be positioned at every $n^{th}$ position from the sample (112) which adjoins the two sides of the predetermined block 18 along the rows and the predetermined samples are positioned at every $m^{th}$ position from the sample (112) of the predetermined sample which (112) adjoins the two sides of the predetermined block (18) along the columns, wherein n, m>1. In some cases, n=m (e.g., in FIGS. 7.2 and 7.3, where the samples 104, 118', 118", directly obtained by ALWIP at 812 and indicated with grey squares, are alternated, along rows and columns, to the samples 108, 108' subsequently obtained at step 813).

Along at least one of the rows (17c) and columns (17a), it may be possible to perform the determining the support values e.g. by downsampling or averaging (122), for each support value, a group (120) of neighbouring samples within the plurality of neighbouring samples which includes the neighbouring sample (118) for which the respective support value is determined. Hence, in FIG. 7.4, at step 813 it is possible to obtain the value of sample 119 by using the values of the predetermined sample 118''' (previously obtained at step 812) and the neighbouring sample 118 as support values.

The plurality of neighbouring samples may extend one-dimensionally along two sides of the predetermined block (18). It may be possible to perform the reduction (811) by grouping the plurality of neighbouring samples (17) into groups (110) of one or more consecutive neighbouring samples and performing a downsampling or an averaging on each of the group (110) of one or more neighbouring samples which has two or more than two neighbouring samples.

In examples, the linear or affine linear transformation may comprise $P_{red}*Q_{red}$ or $P_{red}*Q$ weighting factors with $P_{red}$ being the number of sample values (102) within the reduced set of sample values and $Q_{red}$ or Q is the number predetermined samples within the predetermined block (18). At least ¼ $P_{red}*Q_{red}$ or ¼ $P_{red}*Q$ weighting factors are non-zero weighting values. The $P_{red}*Q_{red}$ or $P_{red}*Q$ weighting factors may comprise, for each of the Q or $Q_{red}$ predetermined samples, a series of $P_{red}$ weighting factors relating to the respective predetermined sample, wherein the series, when being arranged one below the other according to a raster scan order among the predetermined samples of the predetermined block (18), form an envelope which is omnidirectionally non-linear. The $P_{red}*Q$ or $P_{red}*Q_{red}$ weighting factors may be unrelated to each other via any regular mapping rule. A mean of maxima of cross correlations between a first series of weighting factors relating to the respective predetermined sample, and a second series of weighting factors relating to predetermined samples other than the respective predetermined sample, or a reversed version of the latter series, whatever leads to a higher maximum, is lower than a predetermined threshold. The predetermined threshold may 0.3 [or in some cases 0.2 or 0.1]. The $P_{red}$ neighbouring samples (17) may be located along a one-dimensional path extending along two sides of the predetermined block (18) and, for each of the Q or $Q_{red}$ predetermined samples, the series of $P_{red}$ weighting factors relating to the respective predetermined sample are ordered in a manner traversing the one-dimensional path in a predetermined direction.

Description of a Methods and Apparatus

For predicting the samples of a rectangular block of width W (also indicated with N) and height H (also indicated with M), Affine-linear weighted intra prediction (ALWIP) may take one line of H reconstructed neighbouring boundary samples left of the block and one line of W reconstructed neighbouring boundary samples above the block as input. If the reconstructed samples are unavailable, they may be generated as it is done in the conventional intra prediction.

A generation of the prediction signal (e.g., the values for the complete block 18) may be based on at least one or some of the following three steps:

1. Out of the boundary samples 17, samples 102 (e.g., four samples in the case of W=H=4 and/or eight samples in other case) may be extracted by averaging or downsampling (e.g., step 811).
2. A matrix vector multiplication, followed by addition of an offset, may be carried out with the averaged samples (or the samples remaining from downsampling) as an input. The result may be a reduced prediction signal on a subsampled set of samples in the original block (e.g., step 812).
3. The prediction signal at the remaining position may be generated, e.g. by upsampling, from the prediction signal on the subsampled set e.g. by linear interpolation (e.g. step 813).

Thanks to steps 1. (811) and/or 3. (813), the total number of multiplications needed in the computation of the matrix-vector product may be such that it is always smaller or equal than 4*W*H. Moreover, the averaging operations on the boundary and the linear interpolation of the reduced prediction signal are carried out by solely using additions and bit-shifts. In other words, in examples at most four multiplications per sample are needed for the ALWIP modes.

In some examples, the matrices (e.g., 17M) and offset vectors (e.g. $b_k$) needed to generate the prediction signal may be taken from sets (e.g., three sets), e.g., $S_0$, $S_1$, $S_2$, of matrices which may be stored, for example, in storage unit(s) of the decoder and of the encoder.

In some examples, the set $S_0$ may comprise (e.g., consist of) $n_0$ (e.g., $n_0=16$ or $n_0=18$ or another number) matrices $A_0^i$, $i \in \{0, \ldots, n_0-1\}$ each of which may have 16 rows and 4 columns and 18 offset vectors $b_0^i$, $i \in \{0, \ldots, n_0-1\}$ each of size 16, to perform the technique according to FIG. 7.1. Matrices and offset vectors of this set are used for blocks 18 of size 4×4. Once the boundary vector has been reduced to a $P_{red}=4$ vector (as for step 811 of FIG. 7.1), it is possible to map the $P_{red}=4$ samples of the reduced set of samples 102 directly into the Q=16 samples of the 4×4 block 18 to be predicted.

In some examples, the set $S_1$ may comprise (e.g., consist of) $n_1$ (e.g., $n_1=8$ or $n_1=18$ or another number) matrices $A_1^i$, $i \in \{0, \ldots, n_1-1\}$, each of which may have 16 rows and 8 columns and 18 offset vectors $b_1^i$, $i \in \{0, \ldots, n_1-1\}$ each of size 16, to perform the technique according to FIG. 7.2 or 7.3. Matrices and offset vectors of this set $S_1$ may be used for blocks of sizes 4×8, 4×16, 4×32, 4×64, 8×4, 8×8, 16×4, 32×4, and 64×4. Additionally, it may also be used for blocks of size W×H with max(W, H)>4 and min(W, H)=4, i.e. for blocks of size 4×16 or 16×4, 4×32 or 32×4 and 4×64 or 64×4. The 16×8 matrix refers to the reduced version of the block 18, which is a 4×4 block, as obtained in FIGS. 7.2 and 7.3.

Additionally or alternatively, the set $S_2$ may comprise (e.g., consists of) $n_2$ (e.g., $n_2=6$ or $n_2=18$ or another number) matrices $A_2^i$, $i \in \{0, \ldots, n_2-1\}$, each of which may have 64 rows and 8 columns and of 18 offset vectors $b_2^i$, $i \in \{0, \ldots, n_2-1\}$ of size 64. The 64×8 matrix refers to the reduced version of the block 18, which is an 8×8 block, e.g. as obtained in FIG. 7.4. Matrices and offset vectors of this set may be used for blocks of sizes 8×16, 8×32, 8×64, 16×8, 16×16, 16×32, 16×64, 32×8, 32×16, 32×32, 32×64, 64×8, 64×16, 64×32, 64×64.

An example of the choice of the set $S_0$, $S_1$, $S_2$ (that could be performed at step 812a) based on the dimensions of the block is summarized in FIG. 12. Different numbers of matrixes per set are possible in alternative examples. Additionally or alternatively, different sizes of matrixes may be used for different sets.

Matrices and offset vectors of that set or parts of these matrices and offset vectors may be used for all other block-shapes.

4.4 Averaging or Downsampling of the Boundary

Here, features are provided regarding step 811.

As explained above, the boundary samples (17a, 17c) may be averaged and/or downsampled (e.g., from P samples to $P_{red} < P$ samples).

In a first step, the input boundaries $\text{bdry}^{top}$ (e.g. 17c) and $\text{bdry}^{left}$ (e.g. 17a) may be reduced to smaller boundaries $\text{bdry}_{red}^{top}$ and $\text{bdry}_{red}^{left}$ to arrive at the reduced set 102. Here, $\text{bdry}_{red}^{top}$ and $\text{bdry}_{red}^{left}$ both consists of 2 samples in the case of a 4×4-block and both consist of 4 samples in other cases.

In the case of a 4×4-block, it is possible to define $$\text{bdry}_{red}^{top}[0]=(\text{bdry}^{top}[0]+\text{bdry}^{top}[1]+1)>>1,$$

$$\text{bdry}_{red}^{top}[1]=(\text{bdry}^{top}[2]+\text{bdry}^{top}[3]+1)>>1,$$

and define $\text{bdry}_{red}^{left}$ analogously. Accordingly, $\text{bdry}_{red}^{top}[0]$, $\text{bdry}_{red}^{top}[1]$, $\text{bdry}_{red}^{left}[0]$ $\text{bdry}_{red}^{left}[1]$ are average values obtained e.g. using bit-shifting operations.

In all other cases (e.g., for blocks of wither width or height different from 4), if the block-width W is given as $W=4*2^k$, for $0 \leq i < 4$ one defines $$\text{bdry}_{red}^{top}[i]=((\Sigma_{j=0}^{2^k-1}\text{bdry}^{top}[i*2^k+j])+1<<(k-1))>>k.$$

and defines $\text{bdry}_{red}^{left}$ analogously.

In still other cases, it is possible to downsample the boundary (e.g., by selecting one particular boundary sample from a group of boundary samples) to arrive at a reduce number of samples. For example, $\text{bdry}_{red}^{top}[0]$ may be chosen among $\text{bdry}^{top}[0]$ and $\text{bdry}^{top}[1]$, and $\text{bdry}_{red}^{top}[1]$ may be chosen among $\text{bdry}^{top}[2]$ and $\text{bdry}^{top}[3]$. It is also possible to define $\text{bdry}_{red}^{left}$ analogously.

The two reduced boundaries $\text{bdry}_{red}^{top}$ and $\text{bdry}_{red}^{left}$ may be concatenated to a reduced boundary vector $\text{bdry}_{red}$ (associated to the reduced set 102), also indicated with 17P. The reduced boundary vector $\text{bdry}_{red}$ may be thus of size four ($P_{red}=4$) for blocks of shape 4×4 (example of FIG. 7.1) and of size eight ($P_{red}=8$) for blocks of all other shapes (examples of FIGS. 7.2-7.4).

Here, if mode<18 (or the number of matrixes in the set of matrixes), it is possible to define $$\text{bdry}_{red}=[\text{bdry}_{red}^{top},\text{bdry}_{red}^{left}].$$

If mode≥18, which corresponds to the transposed mode of mode−17, it is possible to define $$\text{bdry}_{red}=[\text{bdry}_{red}^{left},\text{bdry}_{red}^{top}].$$

Hence, according to a particular state (one state: mode<18; one other state: mode≥18) it is possible to distribute the predicted values of the output vector along a different scan order (e.g., one scan order: $[\text{bdry}_{red}^{top}, \text{bdry}_{red}^{left}]$; one other scan order: $[\text{bdry}_{red}^{left}, \text{bdry}_{red}^{top}]$).

Other strategies may be carried out. In other examples, the mode index 'mode' is not necessarily in the range 0 to 35 (other ranges may be defined). Further, it is not necessary that each of the three sets $S_0$, $S_1$, $S_2$ has 18 matrices (hence, instead of expressions like mode ≥18, it is possible to mode≥$n_0$, $n_1$, $n_2$, which are the number of matrixes for each set of matrixes $S_0$, $S_1$, $S_2$, respectively). Further, the sets may have different numbers of matrixes each (for example, it may be that $S_0$ has 16 matrixes $S_1$ has eight matrixes, and $S_2$ has six matrixes).

The mode and transposed information are not necessarily stored and/or transmitted as one combined mode index 'mode': in some examples there is the possibility of signalling explicitly as a transposed flag and the matrix index (0-15 for $S_0$, 0-7 for $S_1$ and 0-5 for $S_2$).

In some cases, the combination of the transposed flag and matrix index may be interpreted as a set index. For example, there may be one bit operating as transposed flag, and some bits indicating the matrix index, collectively indicated as "set index".

4.5 Generation of the Reduced Prediction Signal by Matrix Vector Multiplication Here, features are provided regarding step 812.

Out of the reduced input vector $\text{bdry}_{red}$ (boundary vector 17P) one may generate a reduced prediction signal $\text{pred}_{red}$. The latter signal may be a signal on the downsampled block of width $W_{red}$ and height $H_{red}$. Here, $W_{red}$ and $H_{red}$ may be defined as:

$$W_{red}=4, H_{red}=4; \text{ if } \max(W,H) \leq 8,$$

$$W_{red}=\min(W,8), H_{red}=\min(H,8); \text{ else.}$$

The reduced prediction signal $\text{pred}_{red}$ may be computed by calculating a matrix vector-product and adding an offset:

$$\text{pred}_{red} = A \cdot \text{bdry}_{red} + b.$$

Here, A is a matrix (e.g. prediction matrix 17M) that may have $W_{red}*H_{red}$ rows and 4 columns if $W=H=4$ and 8 columns in all other cases and b is a vector that may be of size $W_{red}*H_{red}$.

If $W=H=4$, then A may have 4 columns and 16 rows and thus 4 multiplications per sample may be needed in that case to compute $\text{pred}_{red}$. In all other cases, A may have 8 columns and one may verify that in these cases one has $8*W_{red}*H_{red} \leq 4*W*H$, i.e. also in these cases, at most 4 multiplications per sample are needed to compute $\text{pred}_{red}$.

The matrix A and the vector b may be taken from one of the sets $S_0$, $S_1$, $S_2$ as follows. One defines an index idx=idx (W, H) by setting idx(W, H)=0, if $W=H=4$, idx(W, H)=1, if max(W, H)=8 and idx(W, H)=2 in all other cases. Moreover, one may put m=mode, if mode<18 and m=mode−17, else. Then, if idx≤1 or idx=2 and min(W, H)>4, one may put $A=A_{idx}^m$ and $b=b_{idx}^m$. In the case that idx=2 and min(W, H)=4, one lets A be the matrix that arises by leaving out every row of $A_{idx}^m$ that, in the case W=4, corresponds to an odd x-coordinate in the downsampled block, or, in the case H=4, corresponds to an odd y-coordinate in the downsampled block. If mode≥18, one replaces the reduced prediction signal by its transposed signal. In alternative examples, different strategies may be carried out. For example, instead of reducing the size of a larger matrix ("leave out"), a smaller matrix of $S_1$ (idx=1) with red $W_{red}=4$ and $H_{red}=4$ is used. I.e., such blocks are now assigned to $S_1$ instead of $S_2$.

Other strategies may be carried out. In other examples, the mode index 'mode' is not necessarily in the range 0 to 35 (other ranges may be defined). Further, it is not necessary that each of the three sets $S_0$, $S_1$, $S_2$ has 18 matrices (hence, instead of expressions like mode<18, it is possible to mode<$n_0$, $n_1$, $n_2$, which are the number of matrixes for each set of matrixes $S_0$, $S_1$, $S_2$, respectively). Further, the sets may have different numbers of matrixes each (for example, it may be that $S_0$ has 16 matrixes $S_1$ has eight matrixes, and $S_2$ has six matrixes).

4.6 Linear Interpolation to Generate the Final Prediction Signal

Here, features are provided regarding step 812.

Interpolation of the subsampled prediction signal, on large blocks a second version of the averaged boundary may be needed. Namely, if min(W, H)>8 and W≥H, one writes $W=8*2^l$, and for $0 \leq i < 8$ defines $$\text{bdry}_{redII}^{top}[i] = ((\Sigma_{j=0}^{2^l-1} \text{bdry}^{top}[i*2^l+j]) + 1 << (l-1)) >> l.$$

If min(W, H)>8 and H>W, one defines $\text{bdry}_{redII}^{left}$ analogously.

In addition or alternative, it is possible to have a "hard downsampling", in which the $\text{bdry}_{redII}^{top}[i]$ is equal to $$\text{bdry}_{redII}^{top}[i] = \text{bdry}^{top}[(i+1)*2^l-1].$$

Also, $\text{bdry}_{redII}^{left}$ can be defined analogously.

At the sample positions that were left out in the generation of $\text{pred}_{red}$, the final prediction signal may arise by linear interpolation from $\text{pred}_{red}$ (e.g., step 813 in examples of FIGS. 7.2-7.4 and 8.2). This linear interpolation may be unnecessary, in some examples, if $W=H=4$ (e.g., example of FIGS. 7.1 and 8.1).

The linear interpolation may be given as follows (other examples are notwithstanding possible). It is assumed that W≥H. Then, if H>$H_{red}$, a vertical upsampling of $\text{pred}_{red}$ may be performed. In that case, $\text{pred}_{red}$ may be extended by one line to the top as follows. If W=8, $\text{pred}_{red}$ may have width $W_{red}=4$ and may be extended to the top by the averaged boundary signal $\text{bdry}_{red}^{top}$, e.g. as defined above. If W>8, $\text{pred}_{red}$ is of width $W_{red}=8$ and it is extended to the top by the averaged boundary signal $\text{bdry}_{redII}^{top}$, e.g. as defined above. One may write $\text{pred}_{red}[x][-1]$ for the first line of $\text{pred}_{red}$. Then the signal $\text{pred}_{red}^{ups,ver}$ on a block of width $W_{red}$ and height $2*H_{red}$ may be given as $$\text{pred}_{red}^{ups,ver}[x][2*y+1] = \text{pred}_{red}[x][y],$$

$$\text{pred}_{red}^{ups,ver}[x][2*y] = (\text{pred}_{red}[x][y-1] + \text{pred}_{red}[x][y] + 1) >> 1,$$

where $0 \leq x < W_{red}$ and $0 \leq y < H_{red}$. The latter process may be carried out k times until $2^k * H_{red} = H$. Thus, if H=8 or H=16, it may be carried out at most once. If H=32, it may be carried out twice. If H=64, it may be carried out three times. Next, a horizontal upsampling operation may be applied to the result of the vertical upsampling. The latter upsampling operation may use the full boundary left of the prediction signal. Finally, if H>W, one may proceed analogously by first upsampling in the horizontal direction (if used) and then in the vertical direction.

This is an example of an interpolation using reduced boundary samples for the first interpolation (horizontally or vertically) and original boundary samples for the second interpolation (vertically or horizontally). Depending on the block size, only the second or no interpolation is used. If both horizontal and vertical interpolation is used, the order depends on the width and height of the block.

However, different techniques may be implemented: for example, original boundary samples may be used for both the first and the second interpolation and the order may be fixed, e.g. first horizontal then vertical (in other cases, first vertical then horizontal).

Hence, the interpolation order (horizontal/vertical) and the use of reduced/original boundary samples may be varied.

4.7 Illustration of an Example of the Entire ALWIP Process

The entire process of averaging, matrix-vector-multiplication and linear interpolation is illustrated for different shapes in FIGS. 7.1-7.4. Note, that the remaining shapes are treated as in one of the depicted cases.

Given a 4×4 block, ALWIP may take two averages along each axis of the boundary by using the technique of FIG. 7.1. The resulting four input samples enter the matrix-vector-multiplication. The matrices are taken from the set $S_0$. After adding an offset, this may yield the 16 final prediction samples. Linear interpolation is not necessary for generating the prediction signal. Thus, a total of (4*16)/(4*4)=4 multiplications per sample are performed. See, for example, FIGS. 7.1 and 8.1.

Given an 8×8 block, ALWIP may take four averages along each axis of the boundary. The resulting eight input samples enter the matrix-vector-multiplication, by using the technique of FIG. 7.2. The matrices are taken from the set $S_1$. This yields 16 samples on the odd positions of the prediction block. Thus, a total of (8*16)/(8*8)=2 multiplications per sample are performed. After adding an offset, these samples may be interpolated e.g. vertically by using the top boundary and e.g. horizontally by using the left boundary, for example. See, for example, FIGS. 7.2 and 8.2.

Given an 8×4 block, ALWIP may take four averages along the horizontal axis of the boundary and the four original boundary values on the left boundary, by using the technique of FIG. 7.3. The resulting eight input samples enter the matrix-vector-multiplication. The matrices are taken from the set $S_1$. This yields 16 samples on the odd horizontal and each vertical positions of the prediction block. Thus, a total of (8*16)/(8*4)=4 multiplications per sample are performed. After adding an offset, these samples are interpolated horizontally by using the left boundary, for example. See, for example, FIGS. 7.3 and 8.2.

The transposed case is treated accordingly.

Given a 16×16 block, ALWIP may take four averages along each axis of the boundary. The resulting eight input samples enter the matrix-vector-multiplication, by using the technique of FIG. 7.2. The matrices are taken from the set $S_2$. This yields 64 samples on the odd positions of the prediction block. Thus, a total of (8*64)/(16*16)=2 multiplications per sample are performed. After adding an offset, these samples are interpolated vertically by using the top boundary and horizontally by using the left boundary, for example. See, for example, FIGS. 7.2 and 8.2. See, for example, FIGS. 7.4 and 8.2.

For larger shapes, the procedure may be essentially the same and it is easy to check that the number of multiplications per sample is less than two.

For W×8 blocks, only horizontal interpolation is necessary as the samples are given at the odd horizontal and each vertical positions. Thus, at most (8*64)/(16*8)=4 multiplications per sample are performed in these cases.

Finally for W×4 blocks with W>8, let $A_k$ be the matrix that arises by leaving out every row that correspond to an odd entry along the horizontal axis of the downsampled block. Thus, the output size may be 32 and again, only horizontal interpolation remains to be performed. At most (8*32)/(16*4)=4 multiplications per sample may be performed.

The transposed cases may be treated accordingly.

4.8 Number of Parameters Needed and Complexity Assessment

The parameters needed for all possible proposed intra prediction modes may be comprised by the matrices and offset vectors belonging to the sets $S_0$, $S_1$, $S_2$. All matrix-coefficients and offset vectors may be stored as 10-bit values. Thus, according to the above description, a total number of 14400 parameters, each in 10-bit precision, may be needed for the proposed method. This corresponds to 0,018 Megabyte of memory. It is pointed out that currently, a CTU of size 128×128 in the standard 4:2:0 chroma-subsampling consists of 24576 values, each in 10 bit. Thus, the memory requirement of the proposed intra-prediction tool does not exceed the memory requirement of the current picture referencing tool that was adopted at the last meeting. Also, it is pointed out that the conventional intra prediction modes use four multiplications per sample due to the PDPC tool or the 4-tap interpolation filters for the angular prediction modes with fractional angle positions. Thus, in terms of operational complexity the proposed method does not exceed the conventional intra prediction modes.

4.9 Signalization of the Proposed Intra Prediction Modes

For luma blocks, 35 ALWIP modes are proposed, for example (other numbers of modes may be used). For each Coding Unit (CU) in intra mode, a flag indicating if an ALWIP mode is to be applied on the corresponding Prediction Unit (PU) or not is sent in the bitstream. The signalization of the latter index may be harmonized with MRL in the same way as for the first CE test. If an ALWIP mode is to be applied, the index predmode of the ALWIP mode may be signaled using an MPM-list with 3 MPMS.

Here, the derivation of the MPMs may be performed using the intra-modes of the above and the left PU as follows. There may be tables, e.g. three fixed tables map_angular_to_alwip$_{idx}$, idx∈{0, 1, 2} that may assign to each conventional intra prediction mode predmode$_{Angular}$ an ALWIP mode predmode$_{ALWIP}$=map_angular_to_alwip$_{idx}$[predmode$_{Angular}$].

For each PU of width W and height H one defines and index idx(PU)=idx(W,H)∈{0,1,2} that indicates from which of the three sets the ALWIP-parameters are to be taken as in section 4 above. If the above Prediction Unit PU$_{above}$ is available, belongs to the same CTU as the current PU and is in intra mode, if idx(PU)=idx (PU$_{above}$) and if ALWIP is applied on PU$_{above}$ with ALWIP-mode predmode$_{ALWIP}^{above}$, one puts mode$_{ALWIP}^{above}$=predmode$_{ALWIP}^{above}$.

If the above PU is available, belongs to the same CTU as the current PU and is in intra mode and if a conventional intra prediction mode predmode$_{Angular}^{above}$ is applied on the above PU, one puts mode$_{ALWIP}^{above}$=map_angular_to_alwip$_{idx(PU_{above})}$[predmode$_{Angular}^{above}$].

In all other cases, one puts mode$_{ALWIP}^{above}$=−1 which means that this mode is unavailable. In the same way but without the restriction that the left PU needs to belong to the same CTU as the current PU, one derives a mode mode$_{ALWIP}^{left}$.

Finally, three fixed default lists list$_{idx}$, idx∈{0, 1, 2} are provided, each of which contains three distinct ALWIP modes. Out of the default list list$_{idx(PU)}$ and the modes mode$_{ALWIP}^{above}$ and mode$_{ALWIP}^{left}$, one constructs three distinct MPMs by substituting −1 by default values as well as eliminating repetitions.

4.10 Adapted MPM-List Derivation for Conventional Luma and Chroma Intra-Prediction Modes The proposed ALWIP-modes may be harmonized with the MPM-based coding of the conventional intra-prediction modes as follows. The luma and chroma MPM-list derivation processes for the conventional intra-prediction modes may use fixed tables map_lwip_to_angular$_{idx}$, idx∈{0, 1, 2}, mapping an ALWIP-mode predmode$_{LWIP}$ on a given PU to one of the conventional intra-prediction modes predmode$_{Angular}$=map_lwip_to_angular$_{idx(PU)}$[predmode$_{LWIP}$].

For the luma MPM-list derivation, whenever a neighboring luma block is encountered which uses an ALWIP-mode predmode$_{LWIP}$, this block may be treated as if it was using the conventional intra-prediction mode predmode$_{Angular}$. For the chroma MPM-list derivation, whenever the current luma block uses an LWIP-mode, the same mapping may be used to translate the ALWIP-mode to a conventional intra prediction mode.

4.11 Experimental Results

Evaluation of the test was performed according to the common test conditions JVET-J1010 [2], for the intra-only (AI) and random-access (RA) configurations with the VTM software version 3.0.1. The corresponding simulations were conducted on an Intel Xeon cluster (E5-2697A v4, AVX2 on, turbo boost off) with Linux OS and GCC 7.2.1 compiler.

TABLE 1

Result of CE3-1.2.2 for VTM AI configuration

| | Y | U | V | enc time | dec time |
|---|---|---|---|---|---|
| Class A1 | −1.38% | −0.89% | −0.75% | 152% | 104% |
| Class A2 | −0.75% | −0.25% | −0.24% | 151% | 103% |
| Class B | −0.79% | −0.27% | −0.30% | 155% | 101% |
| Class C | −0.86% | −0.41% | −0.56% | 154% | 100% |
| Class E | −1.11% | −0.40% | −0.49% | 151% | 98% |
| Overall | −0.95% | −0.42% | −0.46% | 153% | 101% |
| Class D | −0.94% | −0.58% | −0.38% | 154% | 101% |
| Class F (optional) | −1.01% | −0.64% | −0.63% | 151% | 99% |

TABLE 2

Result of CE3-1.2.2 for VTM RA configuration

| | Y | U | V | enc time | dec time |
|---|---|---|---|---|---|
| Class A1 | −0.90% | −1.56% | −1.61% | 111% | 100% |
| Class A2 | −0.42% | −0.24% | −0.15% | 109% | 103% |
| Class B | −0.52% | −0.52% | −0.99% | 111% | 99% |
| Class C | −0.52% | −0.71% | −0.56% | 110% | 97% |
| Class E | | | | | |
| Overall | −0.57% | −0.73% | −0.83% | 110% | 100% |
| Class D | −0.54% | −0.77% | −0.70% | 110% | 99% |
| Class F (optional) | −0.72% | −0.66% | −0.45% | 112% | 95% |

4.12 Additional Results with Further Encoder Speedups

We additionally provide two further results for tests that relied on the same syntax as CE 3-1.2.2 but with an optimized Encoder search.

TABLE 1

Result of CE3-1.2.2 for VTM AI configuration, First Encoder Speedup

| | Y | U | V | enc time | dec time |
|---|---|---|---|---|---|
| Class A1 | −1.30% | −0.72% | −0.77% | 137% | 104% |
| Class A2 | −0.65% | −0.21% | −0.20% | 136% | 104% |
| Class B | −0.69% | −0.22% | −0.22% | 137% | 102% |
| Class C | −0.74% | −0.37% | −0.47% | 134% | 103% |
| Class E | −1.00% | −0.42% | −0.39% | 137% | 101% |
| Overall | −0.85% | −0.37% | −0.39% | 136% | 103% |
| Class D | −0.86% | −0.32% | −0.39% | 131% | 103% |
| Class F (optional) | −0.92% | −0.68% | −0.63% | 132% | 102% |

TABLE 2

Result of CE3-1.2.2 for VTM RA configuration, First Encoder Speedup

| | Y | U | V | enc time | dec time |
|---|---|---|---|---|---|
| Class A1 | −0.90% | −1.56% | −1.61% | 111% | 100% |
| Class A2 | −0.42% | −0.24% | −0.15% | 109% | 103% |
| Class B | −0.52% | −0.52% | −0.99% | 111% | 99% |
| Class C | −0.52% | −0.71% | −0.56% | 110% | 97% |
| Class E | | | | | |
| Overall | −0.57% | −0.73% | −0.83% | 110% | 100% |
| Class D | −0.54% | −0.77% | −0.70% | 110% | 99% |
| Class F (optional) | −0.72% | −0.66% | −0.45% | 112% | 95% |

TABLE 3

Result of CE3-1.2.2 for VTM AI configuration, Second Encoder Speedup

| | Y | U | V | enc time | dec time |
|---|---|---|---|---|---|
| Class A1 | −1.13% | −0.71% | −0.67% | 127% | 103% |
| Class A2 | −0.58% | −0.18% | −0.13% | 127% | 102% |
| Class B | −0.59% | −0.25% | −0.29% | 128% | 99% |
| Class C | −0.67% | −0.37% | −0.45% | 125% | 101% |
| Class E | −0.90% | −0.46% | −0.37% | 127% | 100% |
| Overall | −0.75% | −0.38% | −0.38% | 127% | 101% |
| Class D | −0.75% | −0.40% | −0.37% | 124% | 102% |
| Class F (optional) | −0.71% | −0.46% | −0.39% | 124% | 100% |

TABLE 4

Result of CE3-1.2.2 for VTM RA configuration, Second Encoder Speedup

| | Y | U | V | enc time | dec time |
|---|---|---|---|---|---|
| Class A1 | −0.79% | −1.54% | −1.44% | 107% | 98% |
| Class A2 | −0.36% | −0.28% | −0.02% | 106% | 100% |
| Class B | −0.43% | −0.41% | −0.64% | 107% | 97% |
| Class C | −0.44% | −0.68% | −0.42% | 106% | 96% |
| Class E | | | | | |
| Overall | −0.49% | −0.68% | −0.62% | 107% | 97% |
| Class D | −0.43% | −1.09% | −0.66% | 106% | 101% |
| Class F (optional) | −0.59% | −0.47% | −0.41% | 107% | 94% |

6. The Encoder of FIG. 10

Figure 10:
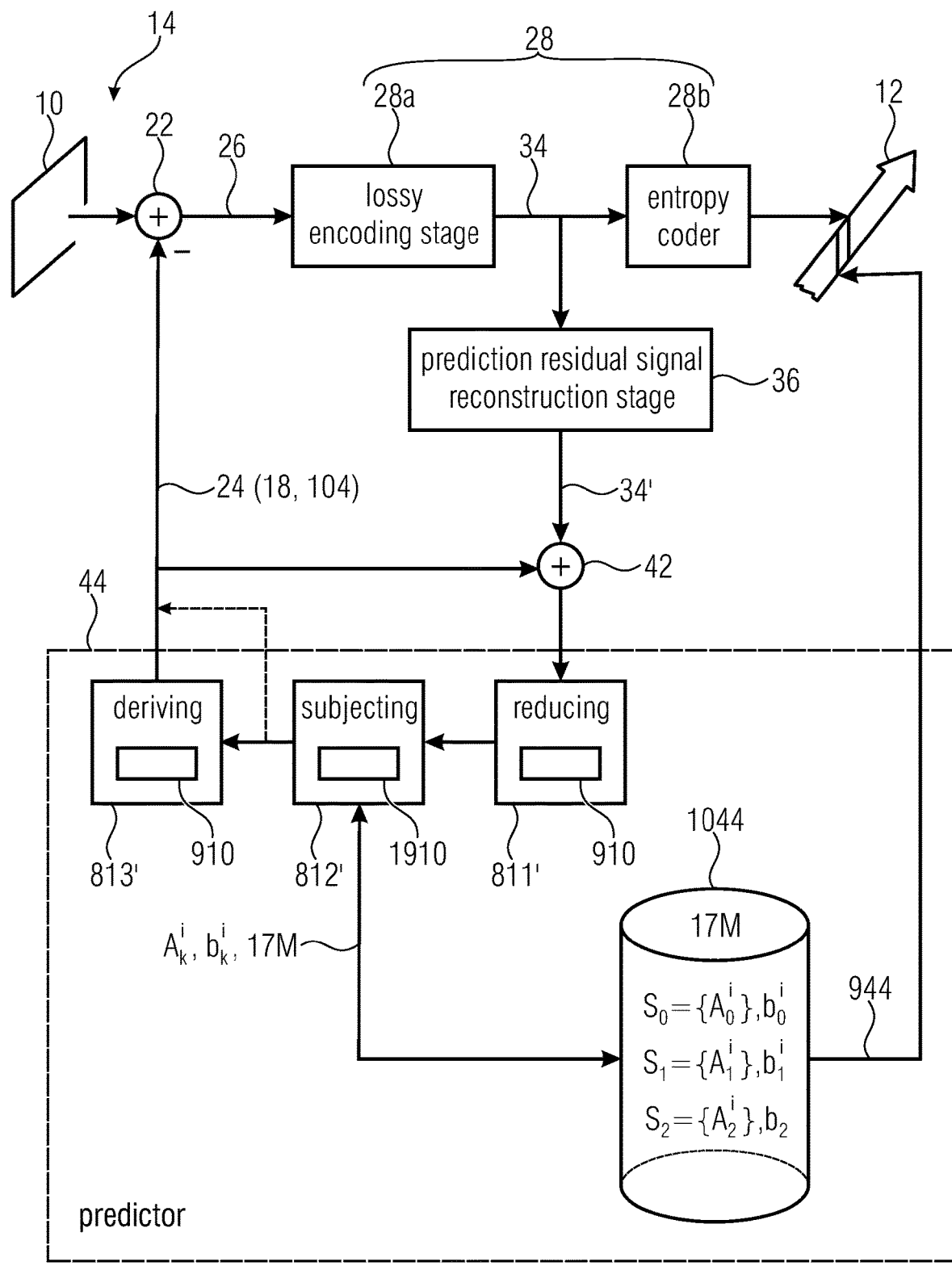
FIG. 10 shows an encoder example.

FIG. 10 shows another example which may be construed from the examples of FIGS. 1, 2, and 5-9 (in particular, some features may be directly derived from FIG. 2 and are therefore here not repeated).

FIG. 10 shows an encoder 14 which may be, for example, a particular case of the encoder of FIG. 1. Analogously to FIG. 2, encoder 14 may comprise a subtractor 22 configured to subtract from the inbound signal, i.e. picture 10 or, on a block basis, current block 18, the corresponding prediction signal 24 (e.g., the block 18 with the reconstructed samples 104 as obtained at step 812), so as to obtain the prediction residual signal 26 which is then encoded by a prediction residual encoder 28 into a datastream 12. The prediction residual encoder 28 may include a lossy encoding stage 28a and a lossless encoding stage (entropy coder) 28b. The lossy encoding stage 28a may receive the prediction residual signal 26 and comprise a quantizer 30 (not shown) configured to quantize the samples of the prediction residual signal 26. The obtained prediction residual signal 34 is then subject to lossless coding by the lossless encoding stage 28b which is an entropy coder entropy coding quantized prediction residual signal 34 into datastream 12. Encoder 14 may further comprise the prediction residual signal reconstruction stage 36 connected to the output of the lossy encoding stage 28a, so as to reconstruct from the transformed and quantized prediction residual signal 34'.

The encoder 14 may comprise an adder 42 to add the reconstructed prediction residual signal 34' as output by stage 36 and the prediction signal 24 (e.g., including the block 18 with the reconstructed samples 104 as obtained at step 813), so as to output a reconstructed signal, i.e. reconstructed samples. This output is fed into the predictor 44 which may then determine the prediction signal 24 based thereon (e.g., by applying the techniques illustrated in FIGS. 8.1-7.4).

As can be seen, in FIG. 9 the method steps 811, 812, 813 are here mapped by stages 811', 812', 813', respectively, within the predictor 44: the method steps 811, 812, 813 may be implemented in hardware units and/or procedural routines, collectively indicated with 811', 812', 813', in the predictor 44 or controlled by the predictor. It is shown that it is possible, in examples, to skip the deriving stage 813', as in the example of FIG. 7.1.

In particular, stage 811 and/or 813 may be depicted as presenting a register such as the register 910 for performing the shifting operations discussed above (the register 910 is not necessarily a part of the stage 811 or 813: it can be a unit which is controlled by the subjecting stage). Instead, stage 812 is depicted as having or controlling a multiplier 1910 in which the multiplications performed between the $P_{red}$ elements of the selected or averaged samples 102 of the neighbouring samples 17 are multiplied by the Q or $Q_{red}$ weighting factors of the matrixes 17M ($A_0^i$). In the stages 811', 812', 813', other elements (such as adders, etc.) are not shown for brevity.

A storage 1044 is here indicated as storing the ALWIP matrixes 17M or $A_0^i$ (e.g., in the sets $S_0$, $S_1$, $S_2$) and offset vectors $b_0^i$ (hereinabove also indicated as $b_k$) The index 944 (e.g., one or more of the indexes discussed above such as i, k, transposed index, set index) i of the matrix and/or offset may be encoded in the datastream 12. The Q or $Q_{red}$ weighting factors are, in general, not signalled in the datastream 12: this is because the decoder already has notion of the Q or $Q_{red}$ weighting factors of the ALWIP matrixes 17M (e.g., has a copy of the data stored in the storage 1044), hence reducing the payload.

Even if not shows in the figures, there is the possibility for the encoder 14 to decide the dimensions of the ALWIP matrixes to be used (e.g., which set among the sets $S_0$, $S_1$, $S_2$), e.g. on the basis of the dimensions of the block 18. In some cases, it is not necessary to signal this choice, as consequent on the choice of the dimensions of the block 18.

Hence, the encoder 14 is configured to insert, for the predetermined block 18, a prediction residual 34 into the data stream 12 from which the predetermined block 18 is reconstructible using the prediction residual and the predicted values 24 (104) for the predetermined samples obtained at the step 812.

In addition or alternatively, the encoder 14 may be configured to insert, for the predetermined block (18), a prediction residual (26, 34) into the data stream (12) which indicates for each of the Q or $Q_{red}$ predetermined samples a corresponding residual value so that the predetermined block (18) may be reconstructed using the prediction residual (26, 34) and the predicted values for the predetermined samples by correcting the predicted value for each of the set of Q or $Q_{red}$ values so that the corresponding reconstructed value depends on the $P_{red}$ neighbouring samples (102) within the reduced set (102) of sample values strictly linearly except for, optionally, a clipping applied after prediction and/or correction.

In addition or alternatively, the encoder 14 may be configured to subdivide the picture (16) into a plurality of blocks of different block sizes, which comprises the predetermined block (18). The encoder 14 may be configured to select the linear or affine linear transformation (19, $A_k$) depending on a width W (also indicated with N) and height H (also indicated with M) of the predetermined block (18) such that the linear or affine linear transformation (19, $A_k$) selected for the predetermined block (18) is selected out of a first set of linear or affine linear transformations as long as the width W and height H of the predetermined block (18) are within a first set (e.g., associated to $S_0$) of width/height pairs and a second set of linear or affine linear transformations as long as the width W and height H of the predetermined block (18) are within a second set (e.g., associated to $S_1$) of width/height pairs which is disjoint to the first set of width/height pairs.

In addition or alternatively, the encoder may be configured so that the third set (e.g. $S_0$) of one or more width/height pairs merely comprises one width/height pair, W', H', and each linear or affine linear transformation within second set of linear or affine linear transformations is for transforming N' sample values to W'*H' predicted values for an W'×H' array of sample positions.

In addition or alternatively, the encoder may be configured so that each of the first and second sets of width/height pairs comprises a first width/height pairs $W_p,H_p$ with $W_p$ being unequal to $H_p$ and a second width/height pair $W_q,H_q$ with $H_q=W_p$ and $W_q=H_p$.

In addition or alternatively, the encoder may be configured so that each of the first and second sets of width/height pairs additionally comprises a third width/height pairs $W_p,H_p$ with $W_p$ being equal to $H_p$ and $H_p>H_q$.

In addition or alternatively, the encoder may be configured to insert for the predetermined block a set index into the data stream, select the linear or affine linear transformation depending on the set index out of a predetermined set of linear or affine linear transformations.

In addition or alternatively, the encoder may be configured so that the plurality of neighbouring samples extend one-dimensionally along two sides of the predetermined block and the encoder is configured to perform the reduction by, for a first subset of the plurality of neighbouring samples, which adjoin a first side of the predetermined block, grouping the first subset into first groups (110) of one or more consecutive neighbouring samples and, for a second subset of the plurality of neighbouring samples, which adjoin a second side of the predetermined block, grouping the second subset into second groups (110) of one or more consecutive neighbouring samples and performing a downsampling or an averaging on each of the first and second groups of one or more neighbouring samples which has more than two neighbouring samples, so as to obtain first sample values from the first groups and second sample values for the second groups, and the encoder configured to select the linear or affine linear transformation depending on the set index out of a predetermined set of linear or affine linear transformations such that two different states of the set index result into a selection of one of the linear or affine linear transformations of the predetermined set of linear or affine linear transformations, and subject the reduced set of sample values to the predetermined linear or affine linear transformation in case of the set index assuming a first of the two different states in form of a first vector to yield an output vector of predicted values, and distribute the predicted values of the output vector along a first scan order onto the predetermined samples of the predetermined block and in case of the set index assuming a second of the two different states in form of a second vector, the first and second vectors differing so that components populated by one of the first sample values in the first vector are populated by one of the second sample values in the second vector, and components populated by one of the second sample values in the first vector are populated by one of the first sample values in the second vector, so as to yield an output vector of predicted values, and distribute the predicted values of the output vector along a second scan order onto the predetermined samples of the predetermined block which is transposed relative to the first scan order.

In addition or alternatively, the encoder may be configured so that each linear or affine linear transformation within first set of linear or affine linear transformations is for transforming $N_1$ sample values to $w_1 * h_1$ predicted values for an $w_1 \times h_1$ array of sample positions and each linear or affine linear transformation within first set of linear or affine linear transformations is for transforming $N_2$ sample values to $w_2 * h_2$ predicted values for an $w_2 \times h_2$ array of sample positions, and wherein for a first predetermined one of the first set of width/height pairs, $w_1$ exceeds the width of the first predetermined width/height pair or $h_1$ exceeds the height of the first predetermined width/height pair, and for a second predetermined one of the first set of width/height pairs neither $w_1$ exceeds the width of the second predetermined width/height pair nor $h_1$ exceeds the height of the second predetermined width/height pair, and the encoder may be configured to perform the reducing (100), by downsampling or averaging, the plurality of neighbouring samples to obtain the reduced set (102) of samples values so that the reduced set (102) of samples values has $N_1$ sample values if the predetermined block is of the first predetermined width/height pair and if the predetermined block is of the second predetermined width/height pair, and perform the subjecting the reduced set of sample values to the selected linear or affine linear transformation by using only a first sub-portion of the selected linear or affine linear transformation which is related to a subsampling of the $w_1 \times h_1$ array of sample positions along width dimension if $w_1$ exceeds the width of the one width/height pair, or along height dimension if $h_1$ exceeds the height of the one width/height pair if the predetermined block is of the first predetermined width/height pair, and the selected linear or affine linear transformation completely if the predetermined block is of the second predetermined width/height pair.

In addition or alternatively, the encoder may be configured so that each linear or affine linear transformation within first set of linear or affine linear transformations is for transforming $N_1$ sample values to $w_1 * h_1$ predicted values for an $w_1 \times h_1$ array of sample positions with $w_1 = h_1$ and each linear or affine linear transformation within first set of linear or affine linear transformations is for transforming $N_2$ sample values to $w_2 * h_2$ predicted values for an $w_2 \times h_2$ array of sample positions with $w_2 = h_2$.

7. The Example of FIG. 11

Figure 11:
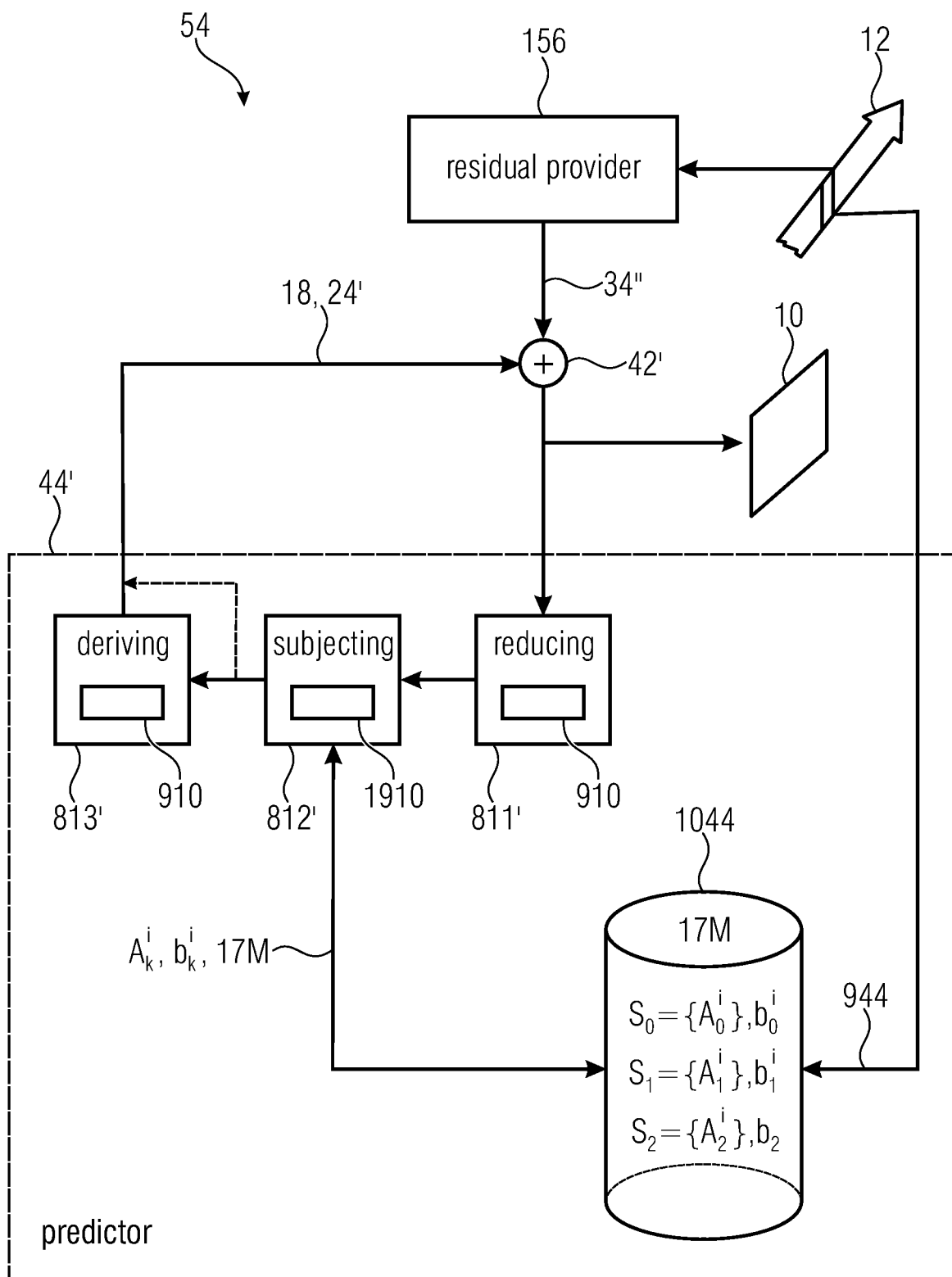
FIG. 11 shows a decoder example.

FIG. 11 shows another example which may be construed from the examples of FIGS. 3-9 (in particular, some features may be directly derived from FIG. 4 and are therefore here not repeated).

FIG. 11 shows a possible implementation of the decoder 54 of FIG. 4, namely one fitting to the implementation of encoder 14 of FIG. 10. In particular, adder 42' and predictor 44' may be connected into a prediction loop in the same manner that they are in encoder 14 of FIG. 10. The reconstructed, i.e. dequantized and retransformed prediction residual signal applied to adder 42' may be derived by a sequence of entropy decoder which inverses the entropy encoding of entropy encoder, followed by the residual signal reconstruction stage which is composed of dequantizer and inverse transformer 40' just as it is the case on encoding side. The decoder's output is the reconstruction of picture 10. The reconstruction of picture 10 may be available directly at the output of adder 42' or, alternatively, at the output of an in-loop filter.

As can be seen, stages 813', 812', 813' may be as the encoder 14, and the storing unit 1044 may store the sets of matrixes as in the encoder 14. Hence, the discussion is here not repeated. The index 944 (e.g., one or more of the indexes discussed above such as i, k, transposed index, set index) may be directly obtained from the datastream 12. The choice among the sets $S_0$, $S_1$, $S_2$ may follow the size (e.g., H/K, or M/N, for example).

In addition or alternatively, the decoder may be configured to derive, for the predetermined block (18), a prediction residual (34") from the data stream (12), and reconstruct (42') the predetermined block (18) using the prediction residual (34") and the predicted values (24') for the predetermined samples (24', 104, 108, 108').

In addition or alternatively, the decoder may be configured to derive, for the predetermined block (18), a prediction residual (34") from the data stream (12) in order to obtain for each of the set of Q or $Q_{red}$ predetermined samples a corresponding residual value, and reconstruct the predetermined block (18) using the prediction residual (34") and the predicted values (24', 104) for the predetermined samples (118', 118") by correcting the predicted value for each of the set of Q or $Q_{red}$ predetermined samples by the corresponding residual value (34") to obtain a corresponding reconstructed value (10) so that the corresponding reconstructed value (10) depends on the $P_{red}$ neighbouring samples (102) within the reduced set of sample values strictly linearly except for, optionally, a clipping applied after prediction and/or correction.

In addition or alternatively, the decoder may be configured so that the decoder is configured to subdivide the picture (10) into a plurality of blocks of different block sizes, which comprises the predetermined block (18), wherein the decoder is configured to select the linear or affine linear transformation (19, 17M, $A_k$) depending on a width W and height H of the predetermined block (18) such that the linear or affine linear transformation selected for the predetermined block (18) is selected out of a first set of linear or affine linear transformations as long as the width W and height H of the predetermined block (81) are within a first set of width/height pairs and a second set of linear or affine linear transformations as long as the width W and height H of the predetermined block are within a second set of width/height pairs which is disjoint to the first set of width/height pairs.

In addition or alternatively, the decoder may be configured so the decoder is configured to subdivide the picture (10) into a plurality of blocks of different block sizes, which comprises the predetermined block (18), wherein the decoder is configured to select the linear or affine linear transformation (19, 17M, $A_k$) depending on a width W and height H of the predetermined block (18) such that the linear or affine linear transformation selected for the predetermined block (18) is selected out of a first set of linear or affine linear transformations as long as the width W and height H of the predetermined block (18) are within a first set of width/height pairs, a second set of linear or affine linear transformations as long as the width W and height H of the predetermined block (18) are within a second set of width/height pairs which is disjoint to the first set of width/height pairs, and a third set of linear or affine linear transformations as long as the width W and height H of the predetermined block (18) are within a third set of one or more width/height pairs, which is disjoint to the first and second sets of width/height pairs.

In addition or alternatively, the decoder may be configured so the third set of one or more width/height pairs merely comprises one width/height pair, W', H', and each linear or affine linear transformation within first set of linear or affine linear transformations is for transforming N' sample values to W'*H' predicted values for an W'×H' array of sample positions.

In addition or alternatively, the decoder may be configured so Each of the first and second sets of width/height pairs comprises a first width/height pairs $W_p$, $H_p$ with $W_p$ being unequal to $H_p$ and a second width/height pair $W_q$, $H_q$ with $H_q=W_p$ and $W_q=H_p$.

In addition or alternatively, the decoder may be configured so Each of the first and second sets of width/height pairs additionally comprises a third width/height pairs $W_p$, $H_p$ with $W_p$ being equal to $H_p$ and $H_p>H_q$.

In addition or alternatively, the decoder may be configured so Read for the predetermined block (18) a set index (k) from the data stream (12), select the linear or affine linear transformation depending on the set index (k) out of a predetermined set of linear or affine linear transformations.

In addition or alternatively, the decoder may be configured so the plurality of neighbouring samples (17) extend one-dimensionally along two sides of the predetermined block (18) and the decoder is configured to perform the reduction (811) by, for a first subset of the plurality of neighbouring samples, which adjoin a first side of the predetermined block, grouping the first subset into first groups (110) of one or more consecutive neighbouring samples and, for a second subset of the plurality of neighbouring samples, which adjoin a second side of the predetermined block, grouping the second subset into second groups (110) of one or more consecutive neighbouring samples and performing a downsampling or an averaging on each of the first and second groups of one or more neighbouring samples which has more than two neighbouring samples, so as to obtain first sample values from the first groups and second sample values for the second groups, and the decoder may be configured to select the linear or affine linear transformation depending on the set index out of a predetermined set of linear or affine linear transformations such that two different states of the set index result into a selection of one of the linear or affine linear transformations of the predetermined set of linear or affine linear transformations, and subject the reduced set of sample values to the predetermined linear or affine linear transformation, in case of the set index assuming a first of the two different states in form of a first vector to yield an output vector of predicted values, and distribute the predicted values of the output vector along a first scan order onto the predetermined samples of the predetermined block, and in case of the set index assuming a second of the two different states in form of a second vector, the first and second vectors differing so that components populated by one of the first sample values in the first vector are populated by one of the second sample values in the second vector, and components populated by one of the second sample values in the first vector are populated by one of the first sample values in the second vector, so as to yield an output vector of predicted values, and distribute the predicted values of the output vector along a second scan order onto the predetermined samples of the predetermined block which is transposed relative to the first scan order.

In addition or alternatively, the decoder may be configured so each linear or affine linear transformation within first set of linear or affine linear transformations is for transforming $N_1$ sample values to $w_1*h_1$ predicted values for an $w_1 \times h_1$ array of sample positions and each linear or affine linear transformation within first set of linear or affine linear transformations is for transforming $N_2$ sample values to $w_2*h_2$ predicted values for an $w_2 \times h_2$ array of sample positions, and wherein for a first predetermined one of the first set of width/height pairs, $w_1$ exceeds the width of the first predetermined width/height pair or $h_1$ exceeds the height of the first predetermined width/height pair, and for a second predetermined one of the first set of width/height pairs neither $w_1$ exceeds the width of the second predetermined width/height pair nor $h_1$ exceeds the height of the second predetermined width/height pair, and wherein the decoder is configured to perform the reducing (100), by downsampling or averaging, the plurality of neighbouring samples to obtain the reduced set (102) of samples values so that the reduced set (102) of samples values has $N_1$ sample values if the predetermined block is of the first predetermined width/height pair and if the predetermined block is of the second predetermined width/height pair, and perform the subjecting the reduced set of sample values to the selected linear or affine linear transformation by using only a first sub-portion of the selected linear or affine linear transformation which is related to a subsampling of the $w_1 \times h_1$ array of sample positions along width dimension if $w_1$ exceeds the width of the one width/height pair, or along height dimension if $h_1$ exceeds the height of the one width/height pair if the predetermined block is of the first predetermined width/height pair, and the selected linear or affine linear transformation completely if the predetermined block is of the second predetermined width/height pair.

In addition or alternatively, the decoder may be configured so each linear or affine linear transformation within first set of linear or affine linear transformations is for transforming $N_1$ sample values to $w_1*h_1$ predicted values for an $w_1 \times h_1$ array of sample positions with $w_1=h_1$ and each linear or affine linear transformation within first set of linear or affine linear transformations is for transforming $N_2$ sample values to $w_2*h_2$ predicted values for an $w_2 \times h_2$ array of sample positions with $w_2=h_2$.

8. Discussion on Effects of the Present Techniques

Independently of using operations such as bit-shifting for averaging and/or interpolating (which comes, inter alia, to the effect of reducing the computational efforts) it is also noted that other effects may be obtained which, in some examples, may even transcend from the effective use of bit-shifting.

In particular, with the present examples, prediction modes can be shared across different block-shapes, so that the selection of the ALWIP matrix 17M (e.g. at step 812a) is performed on a limited number of sets. E.g., there may be less sets of ALWIP matrixes than possible dimensions (e.g. pairs of heights/widths) of the blocks 18 to be predicted. Reference can be made to FIG. 12, which maps different width/height pairs of blocks 18 to be predicted into one of sets $S_0$ (e.g. with $n_0$ matrixes, e.g. with $n_0=16$), $S_1$ (e.g. with $n_1$ matrixes, e.g. with $n_1=8$), and $S_2$ (e.g. with $n_2$ matrixes, e.g. with $n_2=6$), as discussed above (different repartitions may be possible).

For example, the 16×8 matrixes of set $S_1$ may be shared by prediction modes for blocks with any of the dimensions 4×8, 4×16, 4×32, 4×64, 8×4, 8×8, 16×4, 32×4, and 64×4, and the 64×8 matrixes of set $S_2$ may be shared by prediction modes for blocks with any of the dimensions 8×16, 8×32, 8×64, 16×8, 16×16, 16×32, 16×64, 32×8, 32×16, 32×32, 32×64, 64×8, 64×16, 64×32, 64×64. It is simply necessary to perform techniques such as those discussed for the reducing step 811 (see above) for reducing the dimensions of the boundary 17 to the necessary $P_{red}$ number of samples for forming the set 102, but, at step 812, the original dimension of the block 18 to be predicted is irrelevant. At the step 813 (if implemented), it will be possible to arrive at the complete prediction of the block by simply perform interpolations.

It has been noted that this approach permits to reduce the storage space necessary at the storage space 1044 at unexpected dimensions of 16*16*4+8*16*8+6*64*8=5120 values (e.g., each value being, for example, an 8-bit value).

In comparison, a traditional technique would entail to use a set of matrixes for each width/height pairs. As can be easily understood from FIG. 12, there would be needed 25 sets! It can be easily understood how 25 sets of matrixes entail much more than a storage space of 5120 values. In order to reduce the necessary storage space, it would therefore necessary to reduce the number of matrixes for each set: however, if only few matrixes are at disposal for the prediction, quality would be reduced!

The reduction of the storage space in view of the sharing technique is even amplified by the reduction of the size of the stored matrixes themselves. For example, the prediction of a M×N=64×64 block would entail a matrix of size Q×P=(M*N)×(M+N), i.e. with (64*64)*(64+64)=524288 values to be stored in the storage space! Hence, with the present techniques it is possible to save even more storage space than expected.

Hence, the present techniques permit to reduce the number of parameters that need to be stored in the unit 1044.

With or without the actual use of the bit-shifting, the storage resources at disposal of the encoder or decoder may be reduced or, conversely, more prediction modes may be used to parity of storage space.

Optimal effects are notwithstanding achieved by combining the bit-shifting techniques (at step 811 and/or 813) with that of sharing the same prediction mode for multiple modes (at step 812).

With respect to the traditional approach of using 25 different sets for the 25 different pairs of height/width, the present technique could apparently be interpreted as increasing complexity (as step 811 and/or 813 is not conceivable with traditional techniques). However, the introduction of step 811 and/or 813 can be more than compensated by the reduction of multiplications.

Moreover, with respect to the traditional approach of using 25 different sets for the 25 different pairs of height/width, the instructions necessary for controlling this processing use more storing space (as additional instructions for step 811 and/or 813 are to be stored). However, the necessity of storing the instructions for step 811 and/or 813 can be more than compensated by the reduction of space implied by the reduced number of matrixes stored.

9. Further Embodiments and Examples

Generally, examples may be implemented as a computer program product with program instructions, the program instructions being operative for performing one of the methods when the computer program product runs on a computer. The program instructions may for example be stored on a machine readable medium.

Other examples comprise the computer program for performing one of the methods described herein, stored on a machine-readable carrier.

In other words, an example of method is, therefore, a computer program having program instructions for performing one of the methods described herein, when the computer program runs on a computer.

A further example of the methods is, therefore, a data carrier medium (or a digital storage medium, or a computer-readable medium) comprising, recorded thereon, the computer program for performing one of the methods described herein. The data carrier medium, the digital storage medium or the recorded medium are tangible and/or non-transitionary, rather than signals which are intangible and transitory.

A further example of the method is, therefore, a data stream or a sequence of signals representing the computer program for performing one of the methods described herein. The data stream or the sequence of signals may for example be transferred via a data communication connection, for example via the Internet.

A further example comprises a processing means, for example a computer, or a programmable logic device performing one of the methods described herein.

A further example comprises a computer having installed thereon the computer program for performing one of the methods described herein.

A further example comprises an apparatus or a system transferring (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example, a field programmable gate array) may be used to perform some or all of the functionalities of the methods described herein. In some examples, a field programmable gate array may cooperate with a microprocessor in order to perform one of the methods described herein. Generally, the methods may be performed by any appropriate hardware apparatus.

Equal or equivalent elements or elements with equal or equivalent functionality are denoted in the following description by equal or equivalent reference numerals even if occurring in different figures.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] P. Helle et al., "Non-linear weighted intra prediction", JVET-L0199, Macao, China, October 2018.

[2] F. Bossen, J. Boyce, K. Suehring, X. Li, V. Seregin, "JVET common test conditions and software reference configurations for SDR video", JVET-K1010, Ljubljana, SI, July 2018.

The invention claimed is:

1. A decoder for decoding a picture from a data stream, wherein the decoder is configured to subdivide the picture into a plurality of blocks of different block sizes which comprises a predetermined block, wherein the decoder is configured to predict the predetermined block of the picture using a plurality of neighbouring samples by reducing the plurality of neighbouring samples to acquire a reduced set of samples values lower, in number of samples, than compared to the plurality of neighbouring samples, subjecting the reduced set of sample values to a linear or affine linear transformation to acquire predicted values for predetermined samples of the predetermined block,
wherein the decoder is configured to perform the reduction by grouping the plurality of neighbouring samples into groups of one or more consecutive neighbouring samples and performing a downsampling or an averaging on each of the group of one or more neighbouring samples which comprises two or more than two neighbouring samples,
wherein the decoder is configured to select the linear or affine linear transformation depending on a width W and height H of the predetermined block such that the linear or affine linear transformation selected for the predetermined block is selected out of
a first set of linear or affine linear transformations as long as the width W and height H of the predetermined block are within a first set of width/height pairs and
a second set of linear or affine linear transformations as long as the width W and height H of the predetermined block are within a second set of width/height pairs which is disjoint to the first set of width/height pairs.

2. The decoder of claim 1, further configured to perform the reducing by downsampling.

3. The decoder of claim 1, further configured to perform the reducing by averaging.

4. The decoder of claim 3, wherein averaging comprises bit-shifting.

5. The decoder of claim 1, further configured to
derive, by interpolation, prediction values for further samples of the predetermined block on the basis of the predicted values for the predetermined samples and the plurality of neighbouring samples.

6. The decoder of claim 5, wherein the plurality of neighbouring samples extend one-dimensionally along two sides of the predetermined block, the predetermined samples are arranged in rows and columns and, along at least one of the rows and columns,
the predetermined samples are positioned at every $n^{th}$ position from a sample of the predetermined sample adjoining the two sides of the predetermined block and
the decoder is configured to, based on the plurality of neighbouring samples, determine for each of the at least one of the rows and the columns, a support value for one of the plurality of neighbouring positions, which is aligned to the respective one of the at least one of the rows and the columns,
wherein the decoder is configured to derive, by interpolation, the prediction values for the further samples of the predetermined block on the basis of the predicted values for the predetermined samples and the support values for the neighbouring samples aligned to the at least one of rows and columns.

7. The decoder of claim 6, wherein the predetermined samples are positioned at every $n^{th}$ position from the sample of the predetermined sample which adjoins the two sides of the predetermined block along the rows and the predetermined samples are positioned at every $m^{th}$ position from the sample of the predetermined sample which adjoins the two sides of the predetermined block along the columns, wherein n, m>1.

8. The decoder of claim 7, wherein n=m.

9. The decoder of claim 6, configured to, along at least one of the rows and columns, perform the determining of the support values by downsampling or averaging, for each support value, a group of neighbouring samples within the plurality of neighbouring samples which comprises the neighbouring sample for which the respective support value is determined.

10. The decoder of claim 5, configured to perform the interpolation by bit-shifting.

11. The decoder of claim 1, wherein the plurality of neighbouring samples extend one-dimensionally along two sides of the predetermined block.

12. The decoder of claim 1,
wherein the linear or affine linear transformation comprises $P_{red}*Q_{red}$ or $P_{red}*Q$ weighting factors with $P_{red}$ being the number of sample values within the reduced set of sample values and $Q_{red}$ or Q is the number of predetermined samples within the predetermined block,
wherein at least $\frac{1}{4}P_{red}*Q_{red}$ or $\frac{1}{4}P_{red}*Q$ weighting factors are non-zero weighting values,
which the $P_{red}*Q_{red}$ or $P_{red}*Q$ weighting factors comprise, for each of the Q or $Q_{red}$ predetermined samples, a series of $P_{red}$ weighting factors relating to the respective predetermined sample, wherein the series, when being arranged one below the other according to a raster scan order among the predetermined samples of the predetermined block, form an envelope which is omnidirectionally non-linear.

13. The decoder of claim 12, wherein the $P_{red}*Q$ or $P_{red}*Q_{red}$ weighting factors are unrelated to each other via any regular mapping rule.

14. The decoder of claim 12 wherein a mean of maxima of cross correlations between a first series of weighting factors relating to the respective predetermined sample, and a second series of weighting factors relating to predetermined samples other than the respective predetermined sample, or a reversed version of the latter series, whatever leads to a higher maximum, is lower than a predetermined threshold.

15. The decoder of claim 14, wherein the predetermined threshold is 0.3.

16. The decoder of claim 12, wherein the $P_{red}$ neighbouring samples are located along a one-dimensional path extending along two sides of the predetermined block and, for each of the Q or $Q_{red}$ predetermined samples, the series of $P_{red}$ weighting factors relating to the respective predetermined sample are ordered in a manner traversing the one-dimensional path in a predetermined direction.

17. The decoder of claim 1, configured to
derive, for the predetermined block, a prediction residual from the data stream, and
reconstruct the predetermined block using the prediction residual and the predicted values for the predetermined samples.

18. The decoder of claim 10, configured to
derive, for the predetermined block, a prediction residual from the data stream in order to acquire for each of the set of Q or $Q_{red}$ predetermined samples a corresponding residual value, and
reconstruct the predetermined block using the prediction residual and the predicted values for the predetermined samples by correcting the predicted value for each of the set of Q or $Q_{red}$ predetermined samples by the corresponding residual value to acquire a corresponding reconstructed value so that the corresponding reconstructed value depends on the $P_{red}$ neighbouring samples within the reduced set of sample values strictly linearly except for, optionally, a clipping applied after prediction and/or correction.

19. The decoder of claim 1, wherein the decoder is configured to subdivide the picture into a plurality of blocks of different block sizes, which comprises the predetermined block, wherein the decoder is configured to select the linear or affine linear transformation depending on a width W and height H of the predetermined block such that the linear or affine linear transformation selected for the predetermined block is selected out of a first set of linear or affine linear transformations as long as the width W and height H of the predetermined block are within a first set of width/height pairs, a second set of linear or affine linear transformations as long as the width W and height H of the predetermined block are within a second set of width/height pairs which is disjoint to the first set of width/height pairs, and a third set of linear or affine linear transformations as long as the width W and height H of the predetermined block are within a third set of one or more width/height pairs, which is disjoint to the first and second sets of width/height pairs.

20. The decoder of claim 19, configured so that the third set of one or more width/height pairs merely comprises one width/height pair, W', H', and each linear or affine linear transformation within the third set of linear or affine linear transformations is for transforming N' sample values to W'*H' predicted values for an W'*H' array of sample positions.

21. The decoder of claim 1, configured so that each of the first and second sets of width/height pairs comprises a first width/height pair $W_p$, $H_p$ with $W_p$ being unequal to $H_p$ and a second width/height pair $W_q$, $H_q$ with $H_q=W_p$ and $W_q=H_p$.

22. The decoder of claim 21, configured so that each of the first and second sets of width/height pairs additionally comprises a third width/height pair $W_p$, $H_p$ with $W_p$ being equal to $H_p$ and $H_p > H_q$.

23. The decoder of claim 1, wherein same set of linear or affine linear transformations is shared by multiple pairs of width/height of the predetermined block.

24. The decoder of claim 1, configured to read for the predetermined block a set index from the data stream, select the linear or affine linear transformation depending on the set index out of a predetermined set of linear or affine linear transformations.

25. The decoder of claim 24, wherein the plurality of neighbouring samples extend one-dimensionally along two sides of the predetermined block and the decoder is configured to perform the reduction by, for a first subset of the plurality of neighbouring samples, which adjoin a first side of the predetermined block, grouping the first subset into first groups of one or more consecutive neighbouring samples and, for a second subset of the plurality of neighbouring samples, which adjoin a second side of the predetermined block, grouping the second subset into second groups of one or more consecutive neighbouring samples and performing a downsampling or an averaging on each of the first and second groups of one or more neighbouring samples which comprises more than two neighbouring samples, so as to acquire first sample values from the first groups and second sample values for the second groups, and the decoder being configured to select the linear or affine linear transformation depending on the set index out of a predetermined set of linear or affine linear transformations such that two different states of the set index result into a selection of a same linear or affine linear transformation of the predetermined set of linear or affine linear transformations, and subject the reduced set of sample values to the predetermined linear or affine linear transformation, in case of the set index assuming a first of the two different states in form of a first vector to yield an output vector of predicted values, and distribute the predicted values of the output vector along a first scan order onto the predetermined samples of the predetermined block, and in case of the set index assuming a second of the two different states in form of a second vector, the first and second vectors differing so that components populated by one of the first sample values in the first vector are populated by one of the second sample values in the second vector, and components populated by one of the second sample values in the first vector are populated by one of the first sample values in the second vector, so as to yield an output vector of predicted values, and distribute the predicted values of the output vector along a second scan order onto the predetermined samples of the predetermined block which is transposed relative to the first scan order.

26. The decoder of claim 1, wherein each linear or affine linear transformation within first set of linear or affine linear transformations is for transforming $N_1$ sample values to $w_1*h_1$ predicted values for an $w_1*h_1$ array of sample positions and each linear or affine linear transformation within second set of linear or affine linear transformations is for transforming $N_2$ sample values to $w_2*h_2$ predicted values for an $w_2*h_2$ array of sample positions, and wherein for a first predetermined one of the first set of width/height pairs, $w_1$ exceeds the width of the first predetermined width/height pair or $h_1$ exceeds the height of the first predetermined width/height pair, and for a second predetermined one of the first set of width/height pairs neither $w_1$ exceeds the width of the second predetermined width/height pair nor $h_1$ exceeds the height of the second predetermined width/height pair, and wherein the decoder is configured to perform the reducing, by downsampling or averaging, the plurality of neighbouring samples to acquire the reduced set of samples values so that the reduced set of samples values comprises $N_1$ sample values if the predetermined block is of the first predetermined width/height pair and if the predetermined block is of the second predetermined width/height pair, and perform the subjecting the reduced set of sample values to the selected linear or affine linear transformation by using only a first sub-portion of the selected linear or affine linear transformation which is related to a subsampling of the $w_1*h_1$ array of sample positions along width dimension if $w_1$ exceeds the width of the one width/height pair, or along height dimension if $h_1$ exceeds the height of the one width/height pair if the predetermined block is of the first predetermined width/height pair, and the selected linear or affine linear transformation completely if the predetermined block is of the second predetermined width/height pair.

27. The decoder of claim 1, wherein each linear or affine linear transformation within first set of linear or affine linear transformations is for transforming $N_1$ sample values to $w_1*h_1$ predicted values for an $w_1*h_1$ array of sample positions with $w_1=h_1$ and each linear or affine linear transformation within second set of linear or affine linear transformations is for transforming $N_2$ sample values to $w_2*h_2$ predicted values for an $w_2*h_2$ array of sample positions with $w_2=h_2$.

28. A decoding method for decoding a picture subdivided into a plurality of blocks of different block sizes, which comprises a predetermined block, the method comprising:
predicting a predetermined block of the picture using a plurality of neighbouring samples by
reducing, by downsampling or averaging, the plurality of neighbouring samples to acquire a reduced set of samples values lower, in number of samples, than compared to the plurality of neighbouring samples, wherein reducing comprises grouping the plurality of neighbouring samples into groups of one or more consecutive neighbouring samples and performing a downsampling or an averaging on each of the group of one or more neighbouring samples which comprises two or more than two neighbouring samples, and
subjecting the reduced set of sample values to a linear or affine linear transformation to acquire predicted values for predetermined samples of the predetermined block, wherein subjecting comprises selecting the linear or affine linear transformation depending on a width W and height H of the predetermined block such that the linear or affine linear transformation selected for the predetermined block is selected out of
a first set of linear or affine linear transformations as long as the width W and height H of the predetermined block are within a first set of width/height pairs and
a second set of linear or affine linear transformations as long as the width W and height H of the predetermined block are within a second set of width/height pairs which is disjoint to the first set of width/height pairs.

29. An encoder for encoding a picture into a data stream, the encoder being configured to subdivide the picture into a plurality of blocks of different block sizes, which comprises a predetermined block, the encoder being configured to
predict a predetermined block of the picture using a plurality of neighbouring samples by
reducing the plurality of neighbouring samples to acquire a reduced set of samples values lower, in number of samples, than compared to the plurality of neighbouring samples,
subjecting the reduced set of sample values to a linear or affine linear transformation to acquire predicted values for predetermined samples of the predetermined block,
wherein the encoder is configured to perform the reduction by grouping the plurality of neighbouring samples into groups of one or more consecutive neighbouring samples and performing a downsampling or an averaging on each of the group of one or more neighbouring samples which comprises more than two neighbouring samples,
wherein the encoder is configured to select the linear or affine linear transformation depending on a width W and height H of the predetermined block such that the linear or affine linear transformation selected for the predetermined block is selected out of
a first set of linear or affine linear transformations as long as the width W and height H of the predetermined block are within a first set of width/height pairs and
a second set of linear or affine linear transformations as long as the width W and height H of the predetermined block are within a second set of width/height pairs which is disjoint to the first set of width/height pairs.

30. An encoding method for encoding a picture subdivided into a plurality of blocks of different block sizes, which comprises a predetermined block, the method comprising
predicting a predetermined block of the picture using a plurality of neighbouring samples by
reducing, by downsampling or averaging, the plurality of neighbouring samples to acquire a reduced set of samples values lower, in number of samples, than compared to the plurality of neighbouring samples, wherein reducing comprises grouping the plurality of neighbouring samples into groups of one or more consecutive neighbouring samples and performing a downsampling or an averaging on each of the group of one or more neighbouring samples which comprises two or more than two neighbouring samples; and
subjecting the reduced set of sample values to a linear or affine linear transformation to acquire predicted values for predetermined samples of the predetermined block, wherein subjecting comprises selecting the linear or affine linear transformation depending on a width W and height H of the predetermined block such that the linear or affine linear transformation selected for the predetermined block is selected out of
a first set of linear or affine linear transformations as long as the width W and height H of the predetermined block are within a first set of width/height pairs and
a second set of linear or affine linear transformations as long as the width W and height H of the predetermined block are within a second set of width/height pairs which is disjoint to the first set of width/height pairs.

31. A non-transitory digital storage medium having stored thereon a computer program for performing a decoding method for decoding a picture subdivided into a plurality of blocks of different block sizes, which comprises a predetermined block, the method comprising:
predicting a predetermined block of the picture using a plurality of neighbouring samples by
reducing, by downsampling or averaging, the plurality of neighbouring samples to acquire a reduced set of samples values lower, in number of samples, than compared to the plurality of neighbouring samples, wherein reducing comprises grouping the plurality of neighbouring samples into groups of one or more consecutive neighbouring samples and performing a downsampling or an averaging on each of the group of one or more neighbouring samples which comprises two or more than two neighbouring samples, and
subjecting the reduced set of sample values to a linear or affine linear transformation to acquire predicted values for predetermined samples of the predetermined block, wherein subjecting comprises selecting the linear or affine linear transformation depending on a width W and height H of the predetermined block such that the linear or affine linear transformation selected for the predetermined block is selected out of a first set of linear or affine linear transformations as long as the width W and height H of the predetermined block are within a first set of width/height pairs and a second set of linear or affine linear transformations as long as the width W and height H of the predetermined block are within a second set of width/height pairs which is disjoint to the first set of width/height pairs, when said computer program is run by a computer.

* * * * *